US008639074B2

(12) United States Patent
Tang et al.

(10) Patent No.: US 8,639,074 B2
(45) Date of Patent: Jan. 28, 2014

(54) NANOMECHANICAL PHOTONIC DEVICES

(75) Inventors: Hongxing Tang, New Haven, CT (US);
Mo Li, New Haven, CT (US); Wolfram Pernice, New Haven, CT (US); Chi Xiong, New Haven, CT (US)

(73) Assignee: Yale University, New Haven, CT (US)

( * ) Notice: Subject to any disclaimer, the term of this patent is extended or adjusted under 35 U.S.C. 154(b) by 245 days.

(21) Appl. No.: 12/920,631

(22) PCT Filed: Apr. 9, 2009

(86) PCT No.: PCT/EP2009/054340
§ 371 (c)(1),
(2), (4) Date: Jan. 18, 2011

(87) PCT Pub. No.: WO2009/125014
PCT Pub. Date: Oct. 15, 2009

(65) Prior Publication Data
US 2011/0103733 A1 May 5, 2011

Related U.S. Application Data

(60) Provisional application No. 61/043,607, filed on Apr. 9, 2008, provisional application No. 61/117,792, filed on Nov. 25, 2008.

(51) Int. Cl.
G02B 6/26 (2006.01)
(52) U.S. Cl.
USPC ...... 385/39; 385/1; 385/25; 385/13; 356/73.1
(58) Field of Classification Search
USPC ............................ 385/1, 39, 25, 13; 356/73.1
See application file for complete search history.

(56) References Cited

U.S. PATENT DOCUMENTS

| 5,891,747 | A  | * | 4/1999  | Farah ................................. 438/31 |
| 6,411,752 | B1 | * | 6/2002  | Little et al. ......................... 385/17 |
| 6,625,356 | B2 | * | 9/2003  | Ticknor et al. ................... 385/39 |
| 6,836,583 | B2 | * | 12/2004 | Hsu et al. ......................... 385/16 |
| 7,158,693 | B2 | * | 1/2007  | Tran et al. ........................ 385/13 |
| 7,783,144 | B2 | * | 8/2010  | Chigrinov et al. ............... 385/30 |
| 7,840,099 | B2 | * | 11/2010 | Pan et al. ........................... 385/1 |
| 2005/0150280 | A1 |   | 7/2005  | Tang et al. |
| 2005/0180678 | A1 | * | 8/2005  | Panepucci et al. ............... 385/13 |
| 2008/0089640 | A1 | * | 4/2008  | Beausoleil ....................... 385/24 |
| 2008/0285917 | A1 | * | 11/2008 | Bratkovski et al. ............. 385/30 |
| 2012/0096956 | A1 | * | 4/2012  | Sabarinathan et al. .. 73/862.541 |

OTHER PUBLICATIONS

Almeida, V. R., Barrios, C. A., Panepucci, R. R. & Lipson, M. All-optical control of light on a silicon chip. Nature 431, 1081-1084 (2004).

(Continued)

Primary Examiner — Ellen Kim
(74) Attorney, Agent, or Firm — Winstead PC

(57) ABSTRACT

The present invention relates to devices which operate on gradient optical forces, in particular, nanoscale mechanical devices which are actuable by gradient optical forces. Such a device comprises a waveguide and a dielectric body, with at least a portion of the waveguide separated from the dielectric body at a distance which permits evanescent coupling of an optical mode within the waveguide to the dielectric body. This results in an optical force which acts on the waveguide and which can be exploited in a variety of devices on a nano scale, including all-optical switches, photonic transistors, tuneable couplers, optical attenuators and tuneable phase shifters. The waveguide can also comprise a gap such that two cantilever bridges are formed.

18 Claims, 17 Drawing Sheets

(56) References Cited

OTHER PUBLICATIONS

Almeida, V. R, & Lipson, M. Optical bistability on a silicon chip. Opt. Lett. 29. 2387-2389 (2004).

Almeida, V. R. Panepucci, R. R & Lipson, M. Nanotaper for compact mode conversion. Opt. Lett. 28, 1302-1304 (2003).

Ashkin, A. Acceleration and trapping of particles by radiation pressure. Phys. Rev. Lett. 24, 156-159 (1970).

Azak, N. O. et al.. Nanomechanical displacement detection using fiber-optic interferometry. Applied Physics Letters 91,—(2007).

Bargatin, I., Myers, E. B., Arlett. J., Gudlewski, B. & Roukes, M. L. Sensitive detection of nanomechanical motion using piezoresistive signal downmixing. Applied Physics Letters 86,—(2005).

C. A. Barrios, V. R. Almeida, R. Panepucci, M. Lipson, "Electrooptic modulation of silicon-on-insulator submicrometer-size waveguide devices", J. Lightwave Tech. 21, 2332 (2003).

Cahilll, D. G. Thermal conductivity measurement from 30 to 750 K: the $3\omega$ method. Rev. Sci. Instrum. 61, 802-808 (1990).

Carmon, T. et al. Temporal behavior of radiation-pressure-induced vibrations of an optical microcavity phonon mode Physical Review Letters 94 (22) (2005).

Carmon. T. &. Vahala. K. J. Modal spectroscopy of optoexcited vibrations of a micron-scale on-chip resonator at greater than 1 GHz frequency. Phys. Rev. Lett. 98,123901 (2007).

Carr, D. W., Evoy, S., Sekaric, L., Craighead, H. G. & Parpia, J. M. Measurement of mechanical resonance and losses in nanometer scale silicon wires. Applied Physics Letters 75, 920-922 (1999).

S.T. Chu, W. Pan, S. Sato, T. Kaneko, B. E. Little, and Y. Kokubun. "Wavelength trimming of a microring resonator filter by means of a .UV sensitive polymer overlay", IEEE Photonics Technol. Lett. 11, 688 (1999).

G. Cocorullo, M. Iodice, I. Rendina, and P. M. Sarro, "Silicon thermo-optical micro-modulator with 700 kHz—3dB bandwidth". IEEE Photon. Technol.. Lett. 7, 363 (1995).

Craighead, H. G. Nanoelectromechanical systems. Science 290, 1532-1535 (2000).

De Vlaminck, I. et al. Detection of nanomechanical motion by evanescent light wave coupling. Applied Physics Letters 90 (2007).

Eichenfield. M., Michael, C. P., Perahia, R., and Painter, O. Actuation of micro-optomechanical systems via cavity-enhanced optical dipole forces Nature Photonics 1 (7), 416 (2007).

T. T. H. Eng, S. Y. S. Sin, S. C. Kan, G. K. L. Wong, "Micromechanical optical switching with voltage control using SOI movable integrated optical waveguides", IEEE Photonics Technology Letters, 7 1297 (1995).

Etaki, S. el al. Motion detection of a micromechanical resonator embedded in a d.c. SQUID. Nat Phys 4, 785-788 (2008).

Garmire, E. Criteria for optical bistability in a lossy saturating fabryperot Ieee Journal of Quantum Electronics 25 (3), 289 (1989).

J. P. Gordon. "Radiation Forces and Momentia in Dielectric Media," Phys. Rev. A 8(1),14-21 (1973).

M. Hossein-Zadeh and K. J. Vahala, "Photonic RF Down-Converter Based on Optomechanical Oscillation", IEEE Photonics Technology Letters, 20, 234 (2008).

Huang. M. C. Y., Zhou, Y. & Chang-Hasnain. C. J. A nanoelectromechanical tunable laser. Nature Photon. 2, 180-184 (2008).

Huang, X. M. H., Zorman. C. A., Mehregany, M. & Roukes, M. L. Nanodevice motion at microwave frequencies. Nature 421, 496 (2003).

D. B. Hunter, L. G. Edvell, and M.A. Englund, "Wideband microwave photonic channelised receiver", in 2005 Int. Topical Meeting on Microwave Photonics Tech. Dig. Seoul, Korea, pp. 249.

Ilic. B., Krylov, S., Aubin, K., Reichenbach, R. & Craighead. H. G. Optical excitation of nanoelectromechanical oscillators. Appl. Phys. Lett. 86, 1931114 (2005).

S.C. Jun et al, Electrothermal tuning of Al—SiC nanomechanical resonators, Nanotechnology 17, 1506 (2006).

B. Kemp, T. Grzegorczyk, and J. Kong. "Ab initio study of the radiation pressure on dielectric and magnetic media," Opt. Express 13(23).9280-9291 (2005).

L. C. Kimerling, D. Ahn, A. B. Apsel, M. Beals, D. Carothers, Y-K. Chen, T. Conway, D. M. Gill, M. Grove, C-Y Hong, M. Lipson, J. Liu, J. Michel, D. Pan, S. S. Patel, A. T. Pomerene, M. Rasras, D. K. Sparacino K-Y. Tu, A. E. White, and C. W. Wong. "Electronic-photonic integrated circuits on the CMOS platform," Proc. SPIE 6125, 612502 (2006).

Kippenberg, T. J. et al. Analysis of radiation-pressure induced mechanical oscillation of an optical microcavity Physical Review Letters 95 (3) (2005).

Kippenberg, T. J. and Vahala, K. J. Cavity opto-mechanics Optics Express 15 (25),17172 (2007).

Kleckner, D. &. Bouwmeester. D. Sub-kelvin optical cooling of a micromechanical resonator, Nature 444, 75-78 (2006).

Koester, S. J., Schaub, J. D., Dehlinger, G. & Chu, J. O. Germanium-on-SOI infrared detectors for integrated photonic applications. Ieee Journal of Selected Topics in Quantum Electronics 12. 1489-1502 (2006).

A. Kumar, K. Thyagarajan, and A. K. Ghatak, "Analysis of rectangular-core dielectric waveguides: an accurate perturbation approach," Optics Letters 8, 63-65 (1983).

LaHaye. M. D., Buu, O., Camarota. B. & Schwab, K. C. Approaching the quantum limit of a nanomechanical resonator. Science 304, 74-77 (2004).

M. C. M. Lee, M.C. Wu, "Tunable coupling regimes of silicon microdisk resonators using MEMS actuators", Optics Express, vol. 14, Issue 11, pp. 4703-4712, May 2006.

M. C. M. Lee, M. C. Wu, "Vertically-coupled MEMS microdisks for tunable optical delays and dynamic dispersion compensation", CLEO 2005, paper CMY2.

M.C. M. Lee, M. C. Wu, "MEMS Actuated microdisk resonators with variable power coupling ratios", IEEE photonics technology letters 17,1034 (2005).

U. Levy, K. Campbell, A. Groisman, S. Mookherjea, Y. Fainman, "On-chip microfluidic tuning of an optical microring resonator", Appl. Phys. Lett. 88, 111107 (2006).

Li, M. et al. Harnessing optical forces in integrated photonic circuits. Nature in press (2008).

Mo Li, W. H. P. Pernice, C. Xiong, T. Baehr-Jones, M. Hochberg and H. X. Tang, "Harnessing optical forces in integrated photonic circuits" submitted to Nature (2008).

Li, M., Tang,. H. X. & Roukes, M. L. Ultra-sensitive NEMS-based cantilevers for sensing. scanned probe and very high frequency applications. Nature Nanotechnol. 2, 114-120 (2007).

A. C. Lindsay, G. A. Knight, S. T. Winnall, "Photonic mixer for wide bandwidth RF receiver applications", IEEE Transactions on Microwave Theory and Techniques, 43, 2311 (1995).

F. F. Liu, Q. Li. Z. Y. Zhang, M. Qiu, Y.K. Su, "Optically tunable delay line in silicon microring resonator based on thermal nonlinear effect", IEEE I. Quantum Electron. 14, 1077 (2008).

R. Loudon and S. M. Barnett, "Theory of the radiation pressure on dielectric slabs, prisms and single surfaces," Opt. Express 14(24), 11,855-11,869 (2006).

C. K. Madsen, "Efficient architectures for exactly realizing optical filters with optimum bandpass designs", IEEE Photon. Technol. Lett, 10, 1136 (1998).

Mamin, H. J. and Ruger, D. Sub-attonewton force detection at milikelvin temperatures App. Phys. Lett. 79 (20), 3358 (2001).

M. Mansuripur, "Radiation pressure and the linear momentum of light in dispersive dielectric media," Opt. Express 13(6), 2245-2250 (2005).

M. Mansuripur, "Radiation pressure and the linear momentum of the electromagnetic field," Opt. Express 12(22), 5375-5401 (2004).

Masmanidis. S. C. et al. Multifunctional nanomechanical systems via tunably coupled piezoelectric actuation. Science 317, 780-783 (2007).

Metzger, C. H. & Karrai, K. Cavity cooling of a microlever. Nature 432, 1002-1005 (2004).

Mizrahi, A. and Schachter, L. Mirror manipulation by attractive and repulsive forces of guided waves Optics Express 13 (24), 9804 (2005).

(56) References Cited

OTHER PUBLICATIONS

Jan Niehusmann, Andreas Vörckel, Peter Haring Bolivar, Thorsten Wahlbrink, Wolfgang Henschel, and Heinrich Kurz, "Ultrahigh-quality-factor silicon-on-insulator microring resonator", Optics Letters, vol. 29, Issue 24, pp. 2861-2863, Dec. 2004.

Ndieyira, J. W. et al. Nanomechanical detection of antibiotic-mucopeptide binding in a model for superbug drug resistance. Nature Nanotechnology advanced online publication (2008).

Nordstrom, M., Zauner, D. A., Montserrat, C., Jorg, H. & Anja, B. Integrated optical readout for miniaturization of cantilever-based sensor system. Applied Physics Letters 91, 103512 (2007).

Povinelli, M. L. et al. Evanescent-wave bonding between optical waveguides Optics Letters 30 (22). 3042 (2005).

M. L. Povinelli, S. Johnson, M. Loncar, M. Ibanescu, E. Smythe, F. Capasso, J. Joannopoulos, "High-Q enhancement of attractive and repulsive optical forces between coupled whispering-gallery-mode resonators", Optics Express, 13, 8286 (2005).

Pruessner, M. W. el al. End-coupled optical waveguide MEMS devices in the indium phosphide material system. Journal of Micromechanics and Microengineering 16, 832-842 (2006).

Rakich, P. T., Popovic. M. A., Soljacic, M. & Ippen, E. P. Trapping. corralling and spectral bonding of optical resonances through optically induced potentials. Nature Photon. 1, 658-665 (2007).

Rasras, Mahmoud S.; Gill, Douglas M.; Patel, Sanjay S.; Tu, Kun-Yii; Chen, Young-Kai; White, Alice E.; Pomerene, Andrew T. S.; Carothers, Daniel N.; Grove, Michael J.; Sparacin, Daniel K.; Michel, Jurgen; Beals, Mark A.; Kimerling, Lionel C., "Demonstration of a Fourth-Order Pole-Zero Optical Filter Integrated Using CMOS Processes", Journal of Lightwave Technology, vol. 25, issue 1, pp. 87-92, Jan. 2007.

Regal. C. A,. Teufel, J. D. & Lehnert, K. W . Measuring nanomechanical motion with a microwave cavity interferometer. Nature Phys. 4, 555-560 (2008).

H. Rokhsari, T. Kippenberg, T. Carmon, and K. Vahala, "Radiation-pressure-driven micro-mechanical oscillator," Opt. Express 13(14), 5293-5301 (2005).

Rong, H. et al. A continuous-wave Raman silicon laser. Nature 433, 725-728 (2005).

Roukes, M. Nanoelectromechanical systems face the future. Physics World 14, 25-31 (2001).

Rugar, D., Budakian, R., Mamin, H. J. & Chui, B. W. Single spin detection by magnetic resonance force microscopy. Nature 430, 329-332 (2004).

Sader, J. E., Larson, I., Mulvaney. P. &. White, L. R. Method for the calibration of atomic-force microscope cantilevers. Rev. Sci. Instrum. 66, 3789-3798 (1995).

Schliesser,. A., Del'Haye, P., Nooshi, N., Vahala, K. J.. & Kippenberg. T. J. Radiation pressure cooling of a micromechanical oscillator using dynamical backaction. Phys. Rev. Lett. 97, 243905 (2006).

B. Schmidt. Q. Xu, J. Shakya, S. Manipatruni, M. Lipson, "Compact electro-optic modulator on silicon-on-insulator substrates using cavities with ultra-small modal volumes", Opt. Express, 15, 3140 (2007).

J. Schrauwen, D. Van Thourhout, and R. Baets, "Trimming of silicon ring resonator by electron beam induced compaction and strain", Optics Express. 16,3738 (2008).

O. Schwelb. I. Frigyes, "Parallel-coupled phase-matched multiring optical filters", Microwave and optical technology letters 44, 536 (2005).

Soref, R, A. & Bennett, B. R. Electrooptical effects in silicon. IEEE J. Quant. Electron. 23, 123-129 (1987).

Taillaert, D., Bienstman, P. &. Baets., R. Compact efficient broadband grating coupler for silicon-on-insulator waveguides. Opt. Lett.. 29, 2749-2751 (2004).

Thompson, J. D. et al. Strong dispersive coupling of a high-finesse cavity to a micromechanical membrane. Nature 452, 72-U75 (2008).

Truitt, P. A., Hertzberg, J. B., Huang, C. C., Ekinci. K. L. & Schwab, K. C. Efficient .and sensitive capacitive readout of nanomechanical resonator arrays. Nano Letters 7, 120-126 (2007).

S. S. Verbridge, H. G. Craighead, and J. M. Parpia. "A megahertz nanomechanical resonator with room temperature quality factor over a million," Applied Physics Letters 92, 3112-3114 (2008).

Vlasov, Y . Green, W. M. J. & Xia, F. High-throughput silicon nanophotonic wavelength-insensitive switch for on-chip optical networks. Nat Photon 2, 242-246 (2008).

Vlasov, Y. A. & McNab, S. J. Losses in single-mode silicon-on-insulator strip waveguides and bends. Optics Express 12, 1622-1631 (2004).

Walters, D. A. et al.. Short cantilevers for atomic force microscopy. Review of Scientific Instruments 67, 3583•3590 (1996).

R. Watts, A. L. Robinson, R. A. Soref, "Electromechanical optical switching and modulation in micromachined silicon-on-insulator waveguides", IEEE Int. SOI Conf. Proc., Vail Valley. NY, Oct. 1-3, 1991, pp. 62-63.

D. Weinstein, S. A. Bhave, "Internal Dielectric Transduction of a 4.5 GHz Silicon Bar Resonator", IEDM 2007, pp. 415-418.

A. C. Wong, H. Ding, C. T. C. Nguyen, "Micromechanical mixer + filters", IEDM 1998, pp. 471-474.

Q. F. Xu and M. Lipson. "Carrier induced optical bistability in silicon ring resonators", Optics Lett. 1, 341 (2006).

Xu, Q. F., Schmidt, B., Pradhan, S. & Lipson, M. Micrometre-scale silicon electro-optic modulator. Nature 435, 325-327 (2005).

Yang, Y. T., Callegari, C., Feng, X. L., Ekinci, K. L. & Roukes, M. L. Zeptogram-scale nanomechanical mass sensing. Nano Letters 6, 583-586 (2006).

P. Yeh and H. F. Taylor,"Contradirectional frequency-selective couplers for guided-wave optics," Appl. Opt. 19. 2848-2855 (1980).

Zinoviev, K., Dominguez, C., Plaza, J. A., Busto, V. J. C. & Lechuga, L. M. A novel optical waveguide microcantilever sensor for the detection of nanomechanical forces. J. Lightwave Technol. 24, 2132-2138 (2006).

Frisch, Anna Marie, "International Search Report for PCT/EP2009/054340", as mailed Dec. 2, 2009. (7 pages).

Eichenfield, M., et al.: "Measurement of optical forces within a high-Q microcavity-waveguide system" CLEO '07. 2007 Conference on Lasers and Electro-Optics May 5-11, 2007 Baltimore, Md, USA, OSA Piscataway, NJ, USA May 1, 2007, pp. 1-2.

Povinelli, M L et al.: "Enhancement mechanisms for optical forces in integrated optics" Proceedings of the SPIE—The International Society for Optical Engineering, SPIE, vol. 6326, No. 15, Aug. 13, 2006, pp. 632609-8.

Riboli, F., et al.: "Radiation induced force between two planar waveguides", The European Physical Journal D; Atomic, Molecular and Optical Physics, Societa Italiana di Fisica, BO, vol. 46, No. 1, Nov. 23, 2007, pp. 157-164.

\* cited by examiner

NANOMECHANICAL PHOTONIC DEVICES

CROSS-REFERENCE TO RELATED APPLICATIONS

This patent application claims priority from U.S. Provisional Patent Application No. 61/043,607, filed on Apr. 9, 2008 and U.S. Provisional Patent Application No. 61/117,792, filed on Nov. 25, 2008. U.S. Provisional Patent Application No. 61/043,607 and U.S. Provisional Patent Application No. 61/117,792 are incorporated herein by reference.

FIELD OF THE INVENTION

The present invention relates to devices which operate on gradient optical forces, and to methods of manufacturing such devices; in particular, nanoscale mechanical devices which are actuable by gradient optical forces.

BACKGROUND OF THE INVENTION

The optical force is one of the most fundamental properties carried by light. This force is generally considered too small for macroscopic practical use. Yet in the microscopic world, optical tweezers have been widely used to manipulate atoms and micron-sized dielectric particles in free space.

One natural step forward would be exploiting this principle as a driving force in solid state devices such as electromechanical systems. Indeed, recent experiments have elucidated the radiation force of light in high finesse optical microcavities (see references 1 to 3). However, the large footprints involved in these optical microcavities fundamentally limit the scaling of devices down to nanoscale dimensions where exciting quantum phenomena such as macroscopic quantum coherence, generation of squeezed states and optical entanglement start to manifest.

Harnessing optical forces on chip would bring transformational advances in electromechanical systems by offering efficient and ultrahigh bandwidth optical coupling to the sub-micron scale devices. This new transduction is fundamentally distinctive from conventional charge based schemes predominately employed in today's solid state devices. The forces of light stem from two major mechanisms, namely radiation pressure and transverse gradient force.

Radiation pressure induced forces have been extensively studied in the high finesse optical cavities, where light field is confined inside the cavity and the moment of light is transferred to the mirror forming the cavity and applies a perpendicular force to the mirror. Analogously, radiation pressure is also detected in the high finesse microspheres or disk resonators[6]. The transverse gradient force, on the other hand, results from the lateral gradient of propagating light field and therefore applies a transverse force to a dielectric body. Recently it was theoretically predicted that this seemingly small force could be significant in photonic structures due to enhanced light density in submicron scale photonic waveguides (see reference 4).

Recent theories predicted that the optical force can be enhanced in a photonic waveguide without the aid of a cavity and can be directly used for electromechanical actuation; however, on-chip detection of the force has been a significant challenge, primarily owing to the lack of efficient nanoscale mechanical transducers in the photonics domain.

SUMMARY OF THE INVENTION

According to a first aspect of the present invention, there is provided an optomechanical device comprising a waveguide and a dielectric body, wherein at least a portion of the waveguide is separated from the dielectric body at a distance which permits evanescent coupling of the optical mode to the dielectric body whereby a transverse gradient force induced by the optical mode causes a displacement of the waveguide.

The evanescent coupling of the optical mode to the dielectric body results in an optical force due to the transverse gradient force induced by the optical mode. This force is found to be substantial in driving nanomechanical devices.

Preferably, the waveguide is single mode, or configured for single mode operation.

Optionally, the waveguide comprises a gap defining a first and a second cantilever portion of the waveguide.

Cantilevering the waveguide means that a greater range of displacement and hence a greater tuning or attenuation range can be achieved.

Preferably, the device further comprises one or both of an input coupler to couple an optical mode into the waveguide and an output coupler to couple an optical mode out of the waveguide.

Optionally, one or both of the input and output couplers comprise a photonic crystal adapted to support a single transverse mode.

Optionally, the dielectric body comprises a substrate, a second waveguide or a side dielectric body such as a silicon side gate.

Optionally, one of the first or second cantilever portions is substantially longer than the other of said first or second cantilever portions.

Having one cantilever arm longer than the other means that one can remain relatively stationary and the other can benefit from an increased range of movement thus resulting in further improved tuning or attenuation ranges.

Preferably, the input coupler and the output coupler mechanically support the waveguide.

In this way, the couplers which are normally employed only to couple light into a waveguide may serve a dual purpose thus doing away with the need for additional components which might introduce additional optical losses or mechanical problems.

According to a second aspect of the present invention, there is provided a system for high resolution detection of displacement and/or optical forces, the system comprising a device according to the first aspect, and a first and second laser coupled to the device and employed in a pump-probe configuration, wherein the first laser is amplitude modulated to produce a corresponding modulation of the optical force on the waveguide and the second laser provides a probe signal to allow interferometric detection of the effects on the waveguide produced by the modulation.

According to a third aspect of the present invention, there is provided a photonic transistor comprising a gate waveguide which receives an optical signal, a device according to the first aspect, and an optical resonator positioned there between, wherein the optical resonator is coupled to the gate waveguide and to the device waveguide such that modulation of the optical signal produces a corresponding modulation of the optical force on the device waveguide.

Preferably, the photonic transistor further comprises a first laser coupled to the device, whereby modulation of the optical signal within the gate waveguide produces a modulated output at the device output coupler.

According to a fourth aspect of the present invention, there is provided a photonic switch comprising a device having a cantilevered waveguide according to the first aspect, a control bus, and an optical resonator positioned therebetween, wherein the optical resonator is coupled to the control bus and to the device waveguide such that the optical resonator displaces at least one of the first and second cantilever portions of the device waveguide responsive to an optical signal in the control bus.

According to a fifth aspect of the present invention, there is provided a measurement device comprising a device having a cantilevered waveguide according to the first aspect, wherein a measurement signal is collected by coupling to the device substrate.

Optionally, a measurement signal is obtained by measuring the reflection of the optical mode within the device waveguide at the gap.

According to a sixth aspect of the present invention there is provided a tuneable coupler comprising a device according to the first aspect, the device comprising a second waveguide spaced from and substantially parallel to the first waveguide, said first waveguide and second waveguide optically side-coupled such that the optical force produced by the optical mode causes a relative movement of one waveguide relative to the other so as to modify the coupling intensity therebetween.

According to a seventh aspect of the present invention there is provided a tuneable phase shifter comprising a device according to the first aspect, wherein an optical force is applied to deflect the device waveguide so as to produce a phase change affecting the optical mode.

According to an eighth aspect of the present invention synchronised oscillator comprising a device according to the first aspect, the device comprising a second waveguide in series with the first device waveguide.

Preferably, the device comprises three or more waveguides arranged in said series relationship by connecting the output of each device to the input subsequent device, the output of the last such waveguide resonator coupled to the input of the first such resonator.

BRIEF DESCRIPTION OF THE FIGURES

The present invention will now be described by way of example only and with reference to the accompanying figures in which.

DETAILED DESCRIPTION OF THE INVENTION

The Applicant is the first to demonstrate the gradient optical force which beforehand had only been theoretically predicted. Furthermore, the Applicant has demonstrated the practical application of the gradient optical force in a silicon photonic circuit, and further established that this force can be substantial in driving micro- and nanomechanical devices.

Detection of optical forces in an integrated silicon photonic circuit has been made possible through an embedded nanomechanical resonator. The displacement caused by the optical force is detected through evanescent coupling of the nanomechanical resonator to a dielectric substrate. The Applicant has made the surprising discovery that at modest optical power the optical force produced in this way on a photonic waveguide is significant, with a magnitude comparable to that of most commonly used actuation forces in electromechanical systems.

The gradient optical force is distinct from radiation pressure which is the result of the transfer of momentum from photons to mechanical structures on which they impinge. The transverse gradient force however originates from the lateral gradient of a propagating light field. Gradient force is generated by asymmetrically engineering the confined lightwave mode in an optical waveguide. It only becomes significant when the cross section of the waveguide is comparable to the wavelength of the guided mode. Due to the strong confinement of light in a submicron waveguide, the optical force is significantly enhanced at smaller dimensions.

Controlling and harnessing the gradient optical force as taught herein allows solid state devices to operate under new physical principles. Immediate applications include all-optical switching, reconfigurable photonics etc. The following examples illustrate a generic configuration to exhibit the optical force effect which forms the basis for various devices subsequently described, and nanoscale mechanical structures are introduced which, for example, may have masses on the order of picograms and which are significantly affected by tiny optical forces.

Figure 1:
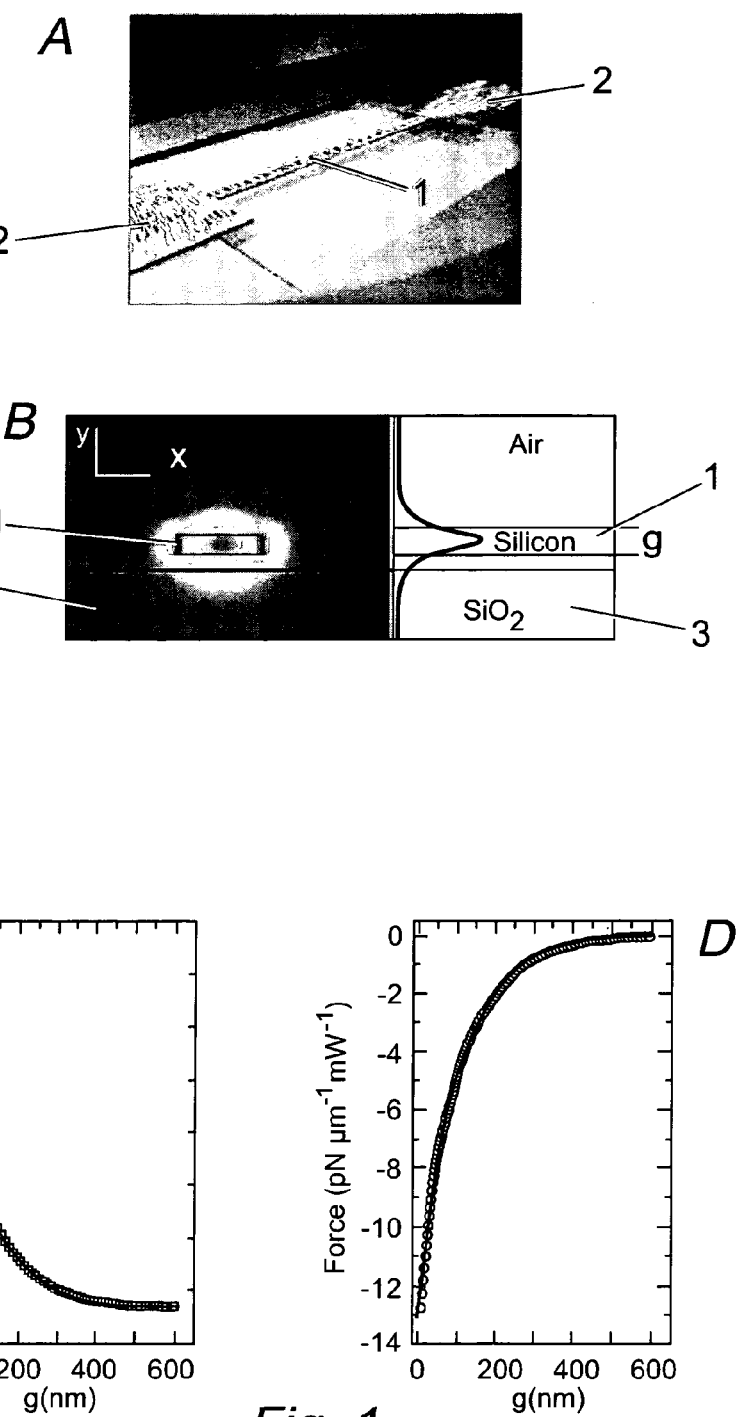
FIG. 1 illustrates the substrate coupled waveguide gradient force. 1a is a three dimensional schematic illustration of a free-standing waveguide beam 1 supported by two multi-mode interference structures 2, with an overlay of the optical mode plot. 1b illustrates the result of finite element simulation showing the $E_x$ component of the optical fields in the waveguide 1 evanescently coupled to the dielectric substrate 3 at the separation gap g, with the black curve on the right showing the magnitude of $E_x$ at the cross-section through the centre of the waveguide 1. $E_x$ is continuous at the bottom surface of the waveguide 1 and at the top surface of the substrate 3. 1c and 1d show that the effective refractive index of the waveguide (1c) and the optical force on the waveguide (1d) strongly depend on the separation g.

The configuration is schematically shown in FIG. 1. Instead of two-coupled waveguides (as described in references 3 and 4), here only one free-standing single mode waveguide 1 is utilized. The force on the single waveguide 1 can be understood similarly to the coupled waveguide pair in which the eigen-energy of the system is dependent on the gap between the waveguide and the substrate. An alternative formalism to derive the force is to consider the asymmetric distribution of the Maxwell stress tensor along the cross-section of the waveguide with the proximity of the substrate. Then the force on the waveguide can be evaluated directly by integration of Maxwell stress tensor on the waveguide surface. The analytical and numerical calculation methods are similar to those disclosed in reference 3.

FIG. 1a is a three-dimensional schematic illustration of a free-standing waveguide beam 1 supported by a multimode interference structure 2 at each end. The overlaid optical mode plot displays the in-plane electrical field distribution of TE mode $E_x$, calculated by finite-element-method (FEM) simulation. The asymmetric guided mode in the free standing waveguide is weakly evanescently coupled with the substrate 3, and it is the corresponding field gradient that produces a net optical force on the waveguide 1.

At a given optical input power, this force on the waveguide 1 strongly depends on the gap between waveguide 1 and substrate 3 as plotted in FIG. 1d. The results clearly show that the magnitude of the optical force is on the order of piconewton per micrometer, which is substantial for actuating nanomechanical devices. As the gap is varied, the effective refractive index $n_{eff}$ of the waveguide system is rapidly modulated, as shown in FIG. 1c. Thus the transverse displacement of the waveguide 1 will induce a phase shift in the device which is measured by on-chip phase-sensitive interferometers. This phase shift can be expressed as:

$$\delta\phi = \delta\left(\frac{2\pi}{\lambda}n_{eff}l\right) = \frac{2\pi}{\lambda}\left(l\frac{\partial n_{eff}}{\partial z} + n_{eff}\frac{\partial l}{\partial z}\right)\delta z, \quad \text{(Equation 1)}$$

where $\lambda$ is wavelength and l is the length of the nanomechanical beam and $\delta z$ is the beam displacement. The first term is dominant while the second term is negligible. Through the measuring the motion of the nanomechanical beam, the optical force can be quantified with high sensitivity.

The force generation scheme discussed here is very universal, and many different device variations might be derived from the Applicant's generic device design. Such an integrated silicon photonic circuit is essentially CMOS compatible.

Figure 2:
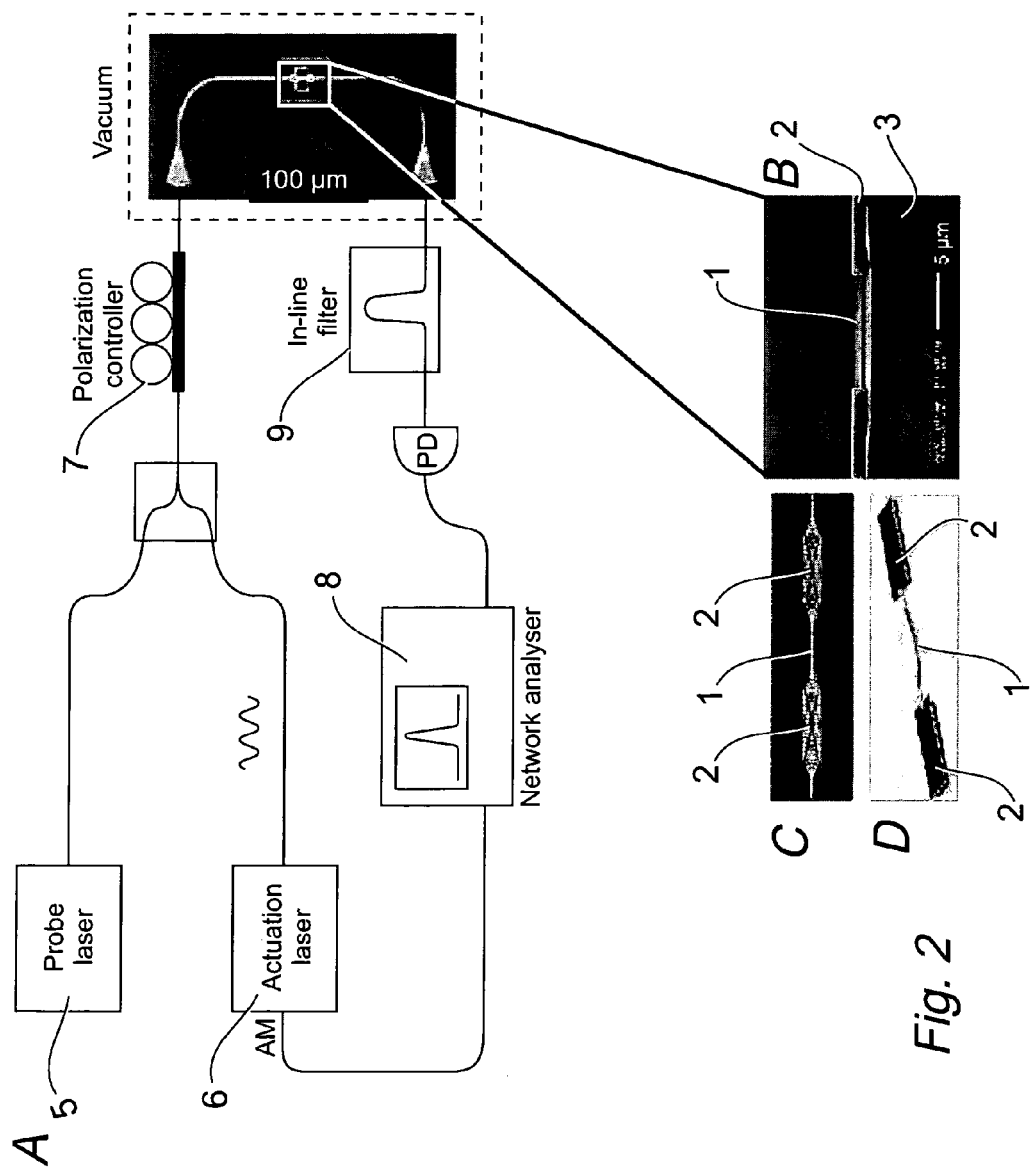
FIG. 2 illustrates, in schematic form, an experimental set-up and device system. 2a shows the measurement set-up. 2b is a scanning electron micrograph of a free-standing, 10 micron long NEMS beam 1. 2c shows the finite-difference time-domain simulation of the mode conversion from the MMI coupler 2 into the NEMS beam. 2d shows the finite element simulation of the mechanical mode shape of the waveguide beam 1, with the strain distribution displayed in shading.

To demonstrate this optical force, the Applicant exploits the high sensitivity offered by nanoelectromechanical systems (NEMS) integrated in a silicon photonic circuit fabricated with a CMOS compatible process. An example of such a circuit is shown in FIG. 2. The simplest form consists of a single mode strip waveguide 1 enclosed by two grating couplers 2 (FIG. 2b). To form the air bridge waveguide 1, a portion of the waveguide 1 is released from the substrate 3 by chemically removing the silicon dioxide layer underneath. This released part of the waveguide 1 becomes an embedded NEMS beam in the photonic circuit. A scanning electron microscope picture of an exemplary suspended, 10 μm long, 500 nm wide beam is shown in FIG. 2b. The separation gap between the beam 1 and the substrate 3 can be varied during fabrication by controlling the etching time, and typically achieved in the range of 300-600 nm.

The use of grating couplers 2 enables efficient coupling of light into and out of the planar waveguides with an out-of-plane optical fibre array. The Applicant has routinely achieved coupling efficiency of 14% (or −8.5 dB) during the fabrication process.

To provide better mechanical clamping and obtain reproducible devices with varying lengths, two low-loss multimode interference (MMI) devices 2 are fabricated to define and support the suspended waveguide beam 1 as shown in FIG. 2c. The MMI design is optimized to provide low optical insertion loss meanwhile maintain high mechanical quality factor. The pair of MMI couplers 2 in the illustrated example introduces additional 6 dB optical loss.

Nanomechanical devices are known to be superior force sensors (see reference 7). The force applied on the beam 1 induces the device's nanomechanical motion, which is further amplified if the force is modulated at the device's mechanical resonance frequency. In the described photonic circuit configuration, the suspended beam 1, including the air gap, comprises a part of the waveguide. The phase of the propagating light is modulated by the transverse motion of the beam 1, which changes the air gap size and thus alternates the effective index of the waveguide mode (as illustrated by FIG. 1c). Using an on-chip interferometer, such as a Fabry-Perot or Mach-Zehnder interferometer, this phase change can be read out as transmission amplitude variation through the device.

In the measurement setup illustrated in FIG. 2a, two wavelength tuneable laser sources 5,6 are used in a pump-probe scheme; one of which (6) is amplitude modulated to generate a dynamic (i.e. time-varying) optical force on the beam 1 and the other (5) acts as the probe for the displacement readout. The TE mode is selected by the polarization controller 7 and launched into the device through one single-mode polarization-maintaining (PM) fibre aligned with the input coupler.

Figure 3:
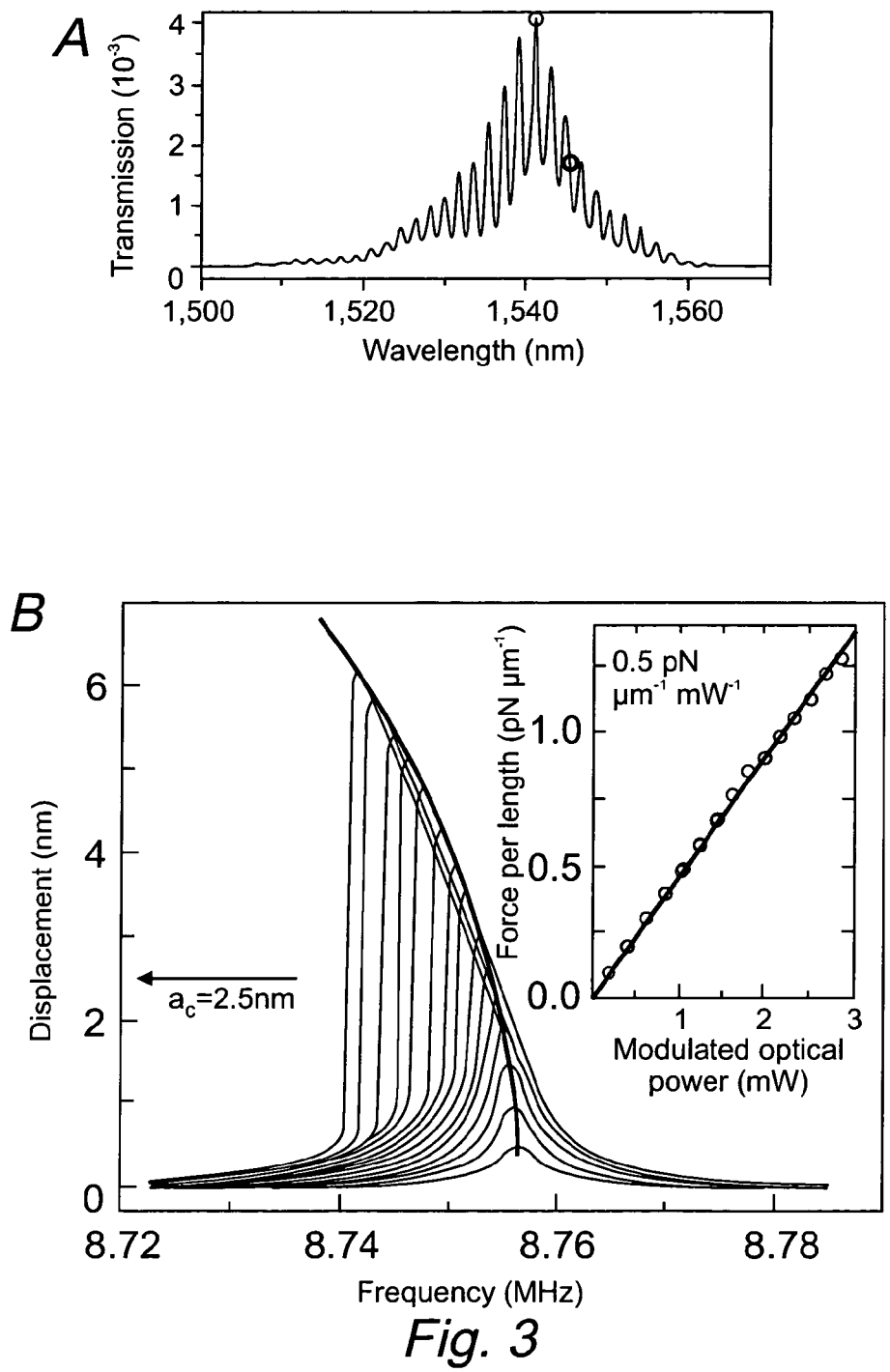
FIG. 3 illustrates the device characterisation and experimental demonstration of the waveguide gradient force. 3a shows the typical transmission spectrum of a device, showing the fringing caused by the Fabry-Perot etalon formed by the input and output couplers. The marker at the peak is the actuation wavelength and the marker two fringes to the right is the probe wavelength. 3b shows the resonance curves of a 10 micron long waveguide beam at varying modulation levels of the actuation light. When the vibration amplitude exceeds the critical amplitude, the response shows a strong softening nonlinearity. The critical amplitude of 2.5±0.1 nm, determined from the backbone curve, agrees well with a theoretical value of 2.2. Inset, the vibration amplitude versus modulated optical power on the device shows a linear response. 3c and 3d show the measured noise showing Lorentzian thermo-mechanical peaks of beams 10 and 13 microns long (respectively). In 3e, the optical force is measured on devices with various beam lengths and substrate separation sizes.
Figure 3:
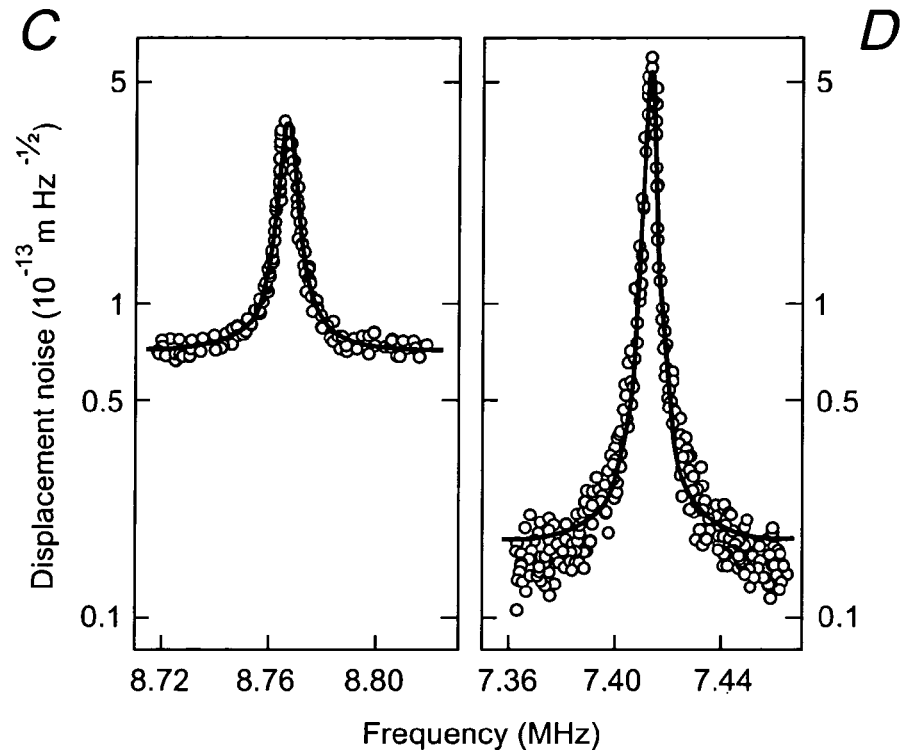
Figure 3:
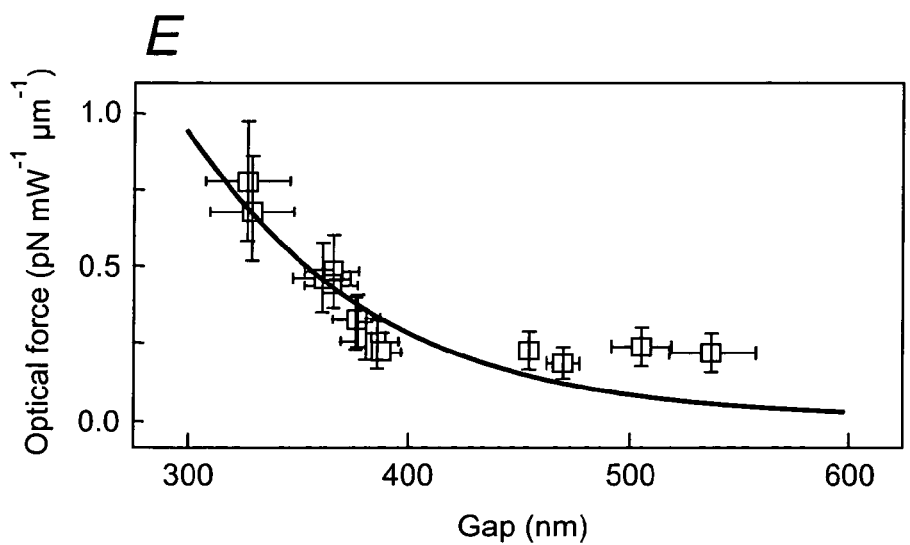
Figure 4:
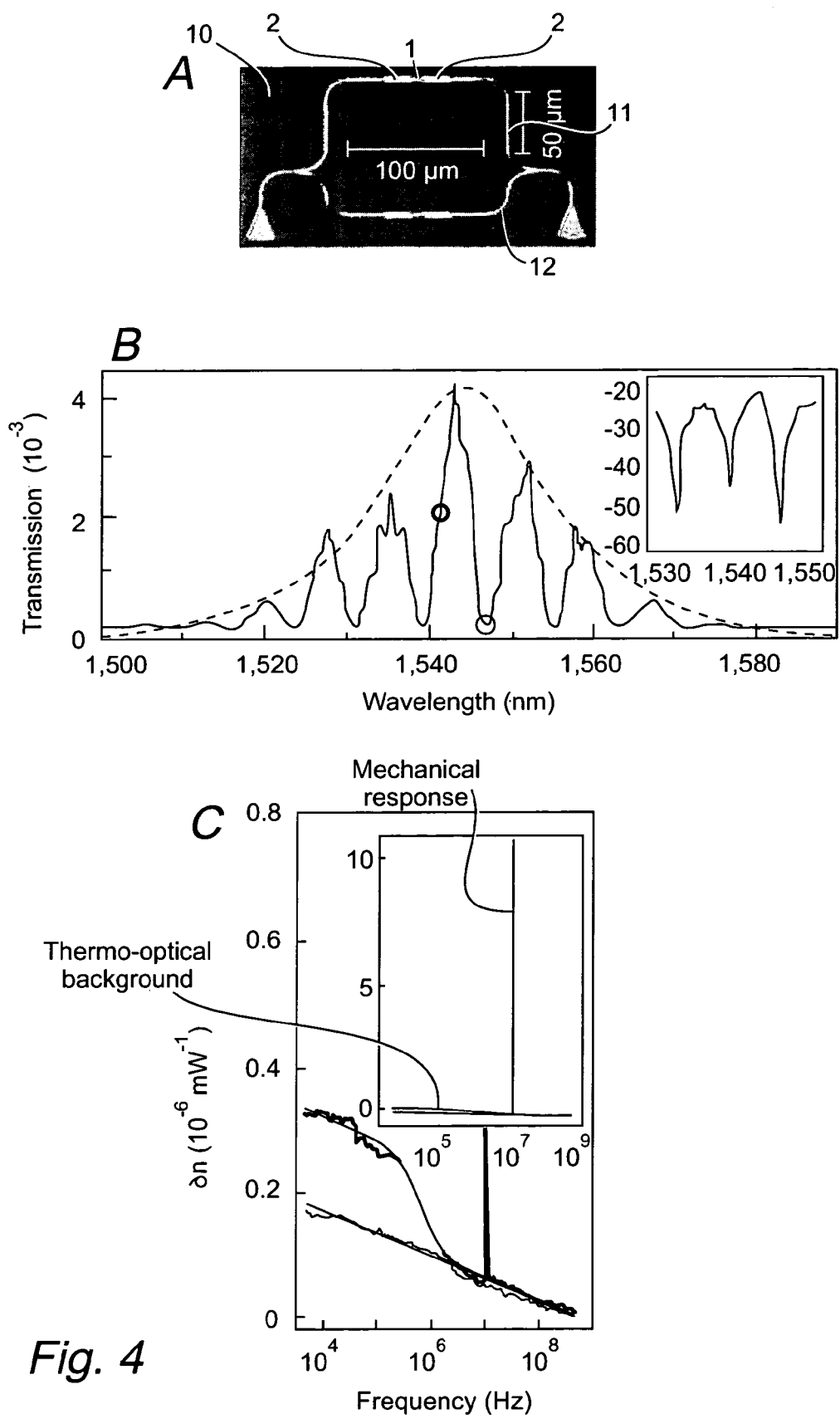
FIG. 4 illustrates the measurement of the thermal response of the device. 4a is an optical micrograph of the Mach-Zender interferometer (MZI) device 10. The path length is 100 microns longer at the top arm 11 than the bottom arm 12. In 3b, the transmission spectrum of the Mach-Zender device shows the interference fringes expected, with good visibility even after release of the waveguide. The right marker indicates the actuation and the left marker the detection lasers. The inset shows an extinction ratio of ~30 dB in the range presented. 4c is a wide frequency measurement of the effective index response of the MZI device with (upper trace) and without (lower trace) the released NEMS beam. The lower trace has a −log(f) dependence on frequency due to the thermo-optical nonlinear effect. The distinct response shown by the upper trace at low frequency is due to the slow thermal response of the suspended beam. 4d shows the dynamic temperature variation of the released NEMS beam versus frequency as well as of the unreleased waveguide. 4e shows the measured mechanical resonance response of the beam. The contribution from the optical force is three orders of magnitude higher than that from the thermal force.
Figure 4:
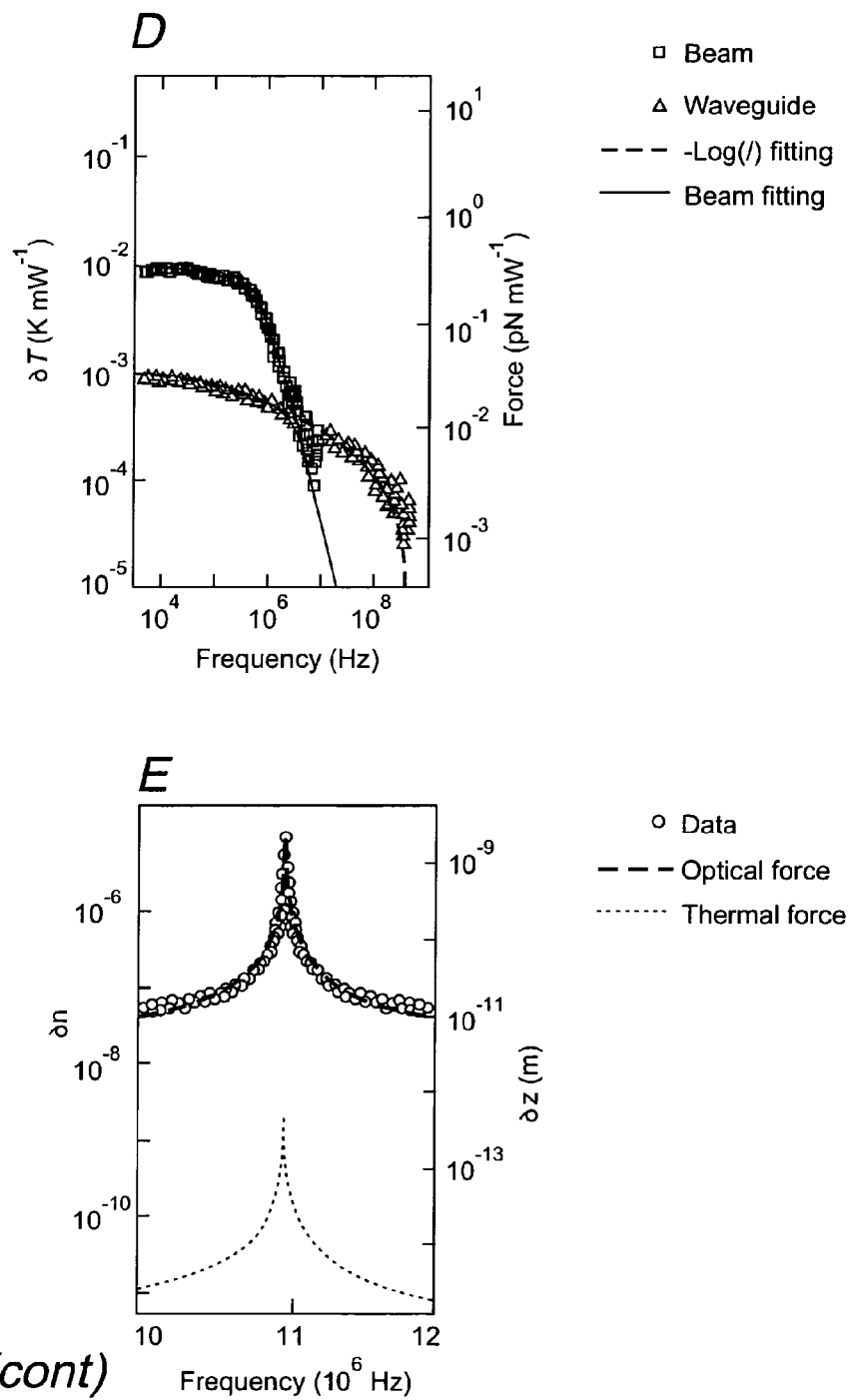

Another fibre aligned with the output coupler collects the transmitted signal. The overall transmission of system is near $4 \times 10^{-3}$ (or $-24$ dB) with most loss at the grating couplers ($-10 \pm 1$ dB each) and the two MMI couplers 2 ($-4$ dB total). In FIG. 3a, the transmission spectrum of a typical device is shown. The grating coupler shows a bandwidth of nearly 20 nm. The transmission oscillates with the wavelength at a periodicity of ~1.9 nm, corresponding to the free spectral range (FSR) of the Fabry-Perot interferometer formed between the two grating couplers. The fringes allow interferometric detection of the motion of the device, with the wavelength of the actuation laser is set at the maximum slope of the transmission. The probe laser wavelength is offset by 5~10 nm from the actuation wavelength to allow sufficient filtering of actuation light before the photodetector.

The sensitivity of the system is first calibrated, by measuring the device's thermomechanical motion. The displacement noise power spectral density (PSD) of the beam at its resonance can be expressed as $$S_z^{1/2} = \sqrt{4k_b T Q/(m\omega_0^3)},$$

where $k_b$ is Boltzmann's constant, T is the absolute temperature, Q is the mechanical quality factor, $\omega_0$ is the angular resonance frequency and m is the effective mass. For a 10 μm long beam with a resonance frequency of 8.87 MHz and quality factor of 1,850 in vacuum, $S_z^{1/2}$ is calculated to be $3.8 \times 10^{-13}$ m·Hz$^{-1/2}$. This thermomechanical motion induces phase noise in the interferometer and thus the transmitted intensity of the probe light. FIG. 3c shows the measured output noise spectrum at the photodetector with 12.5 mW probe light power. Using calculated displacement noise value, the noise floor of the spectrum corresponds to displacement noise PSD of $7.2 \times 10^{-14}$ m·Hz$^{-1/2}$. The total 5 pW·Hz$^{-1/2}$ optical power noise floor is comprised of detector noise (2.5 pW·Hz$^{-1/2}$) and the noise from the diode laser and laser amplifier (noise figure ~5 dB).

To measure the dynamic response of the device, a network analyzer 8 is used to modulate the actuation laser's amplitude and measure the frequency dependence of the transmitted probe signal. In FIG. 3b, the optically driven mechanical response of the devices at varying pump light modulation amplitude is shown. The measured mechanical resonance of the waveguide beam shows a quality factor of ~2000. The actual optical power on the waveguide beam can be derived from the transmitted power, taking account of the intra-cavity enhancement factor of the Fabry-Perot interferometer (see reference 8). The corresponding driving force on the beam can be calculated from the beam's vibration amplitude. In this way, the optical force magnitude can be determined at any given optical power. For the beam with a separation of 360 nm from the substrate, the optical force is evaluated to be 0.45 pN/μm/mW. This value agrees well with the theoretical results presented in FIG. 1d and in the literature.

When excited to high vibration amplitude, the waveguide beam 1 behaves nonlinearly, displaying an uncommon frequency-softening effect due to the residual compressive stress in the silicon film. The critical amplitude of the nonlinearity is given by $$\alpha_c = \omega_0 (L/\pi)^2 \left(\sqrt{3} \rho / EQ\right)^{1/2}$$

theoretically and can be determined by fitting the backbone curve which connects the maxima of the resonance response curves. From the data shown in FIG. 3b, the critical amplitude is measured to be 2.5 nm, fairly close to the theoretically determined value of 2.14 nm. This provides yet another calibration of the optical force measurement.

As illustrated in FIG. 1d, the optical force is a function of the separation gap g between the waveguide beam 1 and the substrate 3. To further elucidate the mechanism of the optical force, the Applicant has measured several devices with varying gap sizes as well as the beam lengths; the result of which is shown in FIG. 3e. The measured optical force shows clear dependence on the gap size, indicating good agreement with the theoretical model. It is also found the optical force is not dependent on the length of the beam. This rules out the photothermal effect as the mechanism of the observed optical force which should be independent of g but increases with beam length due to thermal heating and expansion from optical absorption.

Figure 5:
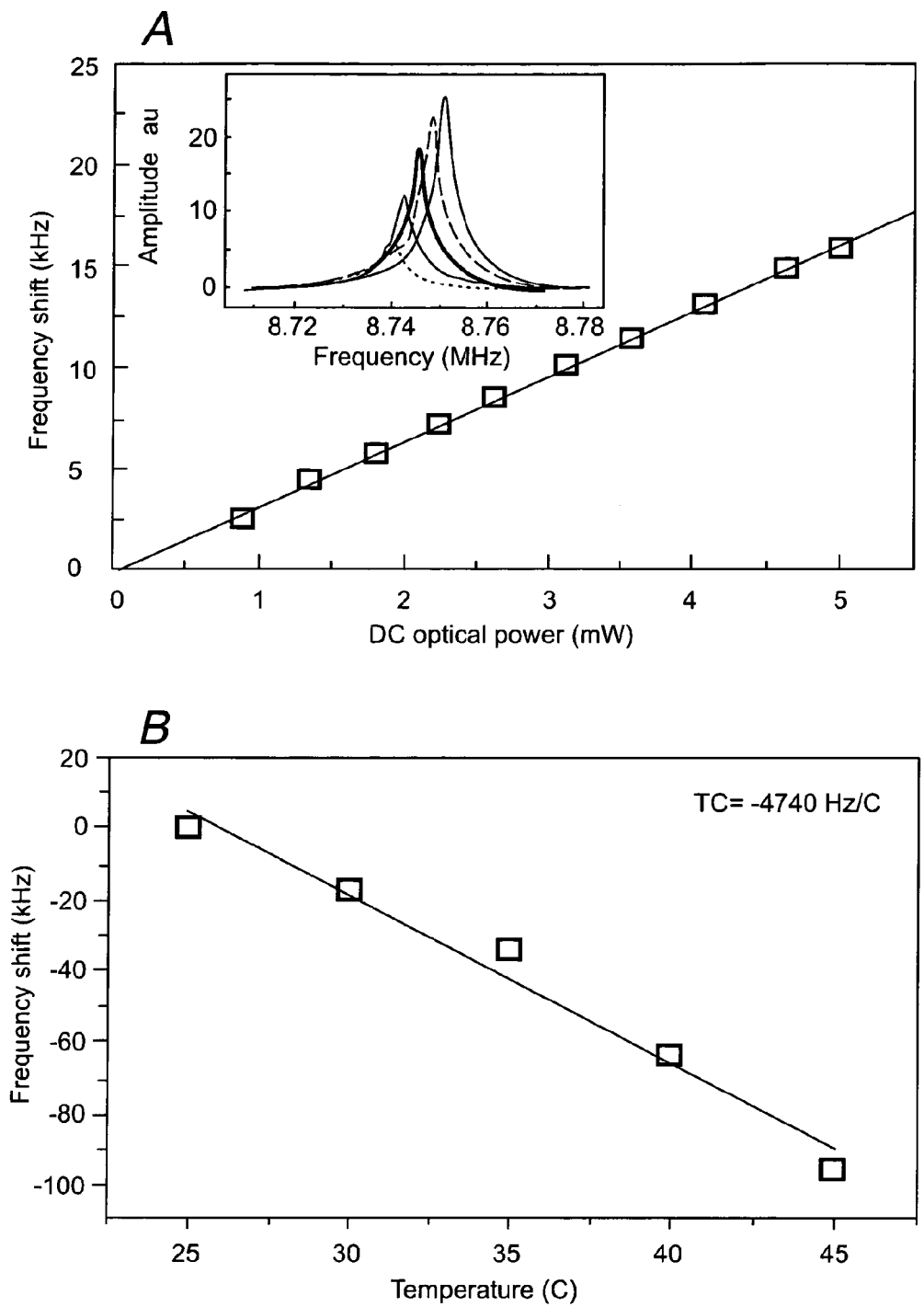
FIG. 5 illustrates the tuning of nanomechanical resonance by (5a) varying the static or "dc" component of the actuation light power and by (5b) raising the temperature of the substrate. If thermal effects dominated in the device, adding static optical power would have a similar effect on the mechanical properties as raising the temperature. The opposite is shown in 5a and 5b which rule out the possibility that it is in fact photothermal force and not the optical force that is actuating the device.

The optical force can also be quantified by static force measurement. A static "dc" optical power on the beam will also exert a static force on it. This static optical force is observed experimentally by measuring the resonance frequency shift of the beam due to increased probe light power. During such measurement, the actuation light power and modulation amplitude are kept constant, and the probe light power is tuned. It is clear from the exemplary data presented in FIG. 5a that the resonance frequency shifts upwards with increasing optical power. Again, this rules out the photothermal effect as the cause for the resonance frequency is observed to have a negative temperature coefficient in a careful temperature controlled experiment, as illustrated in FIG. 5b. The positive frequency shift can be explained by the increased tension in the beam by the increasing static optical force as more optical power is added. The measurement results show the resonance frequency is tuned by optical power at 7.5 kHz/mW. This frequency shift is intensified by the curvature of the beam due to the buckling caused by the residual stress from the fabrication. A simple finite element modelling produces very accurate estimation of this frequency tuning effect. The fitting to the frequency shift yields a static optical force of 0.5 pN/μm/mW, in good agreement with dynamic force measurement.

The magnitude of this transverse optical force on the waveguide is comparable with other types of charge-based actuation forces commonly employed in nanomechanical devices, such as capacitive, piezoelectric and magnetic forces. Further, at nanoscale, electromechanical motion signals are exceedingly small. These tiny signals are generally dominated by parasitic signals on the chip, mostly from direct coupling from the electrical actuation signal. In the photonic waveguide, there is minimum cross-talk between photons in the actuation channel and the sensing channels. The all-optical scheme presented herein not only provides efficient actuation, but also significantly improves the signal quality of a nanomechanical resonator.

Even more significantly, the force generated in optical frequency domain promises an enormous operation bandwidth. This bandwidth is fundamentally limited by the carrier light frequency ($2\times10^{14}$ Hz). Practically this is limited by the bandwidth of the input-output couplers (2.5 THz) implying 3 orders of magnitude improvement over what has been obtained with known electronic actuators. This extremely wide bandwidth (<ps response time), in combination with the high transduction gain, low readout noise will allow a broad range of exciting experiments and devices based upon ultrafast detection and sub-picosecond stroboscopic measurement.

Beyond, arrays of spatially separated nanomechanical resonators can be fabricated along a photonic "bus" for efficient synchronization and high speed optical intercommunications. In this way, one can achieve long-range coherent signal processing without locally addressing individual devices. This eventually will lead to large scale integration of nanomechanical structures and enable new device functions in both mechanical and optical domains.

The strong coupling of light and mechanical oscillation will produce a host of interesting new phenomena that finds practical use as described further herein and in a host of other envisaged applications, such as mechanical Kerr effect, optomechanical parametric amplifications, all-optically controlled tuneable filters, couplers, (de)modulators, mixers etc. On the fundamental fronts, recently we have evidenced huge stride in advancing micro and nanomechanical systems to approaching quantum regimes.

The techniques presented herein seamlessly integrate nanomechanical devices that are size-matched to photonic waveguides meanwhile offers highest engineering flexibility. The elucidated optical force allows efficient coupling between optical field and mechanical vibration at the smallest obtainable mechanical and optical volumes, simultaneously providing high bandwidth and the sensitivity that is required for coherent control of nanomechanical structures. It is foreseeable that ultra-high frequency, active cooled or self cooled, practical quantum devices could become a realistic prospect through exploitation of the transverse optical forces as presented herein.

The devices disclosed herein were fabricated on a silicon-on-insulator (SOI) wafer. The silicon layer is thinned down by thermal oxidation and subsequent wet etch. The devices (waveguides and couplers) were then patterned by electron beam lithography and a plasma dry etching process. The cantilevers are then released from the substrate using a photolithography patterned mask and buffered oxide etching (BOE).

In addition to achieving all-photonic transduction of the nanomechanical beam, it is possible to detect the displacement of the beam without having to employ interferometric techniques.

Figure 10:
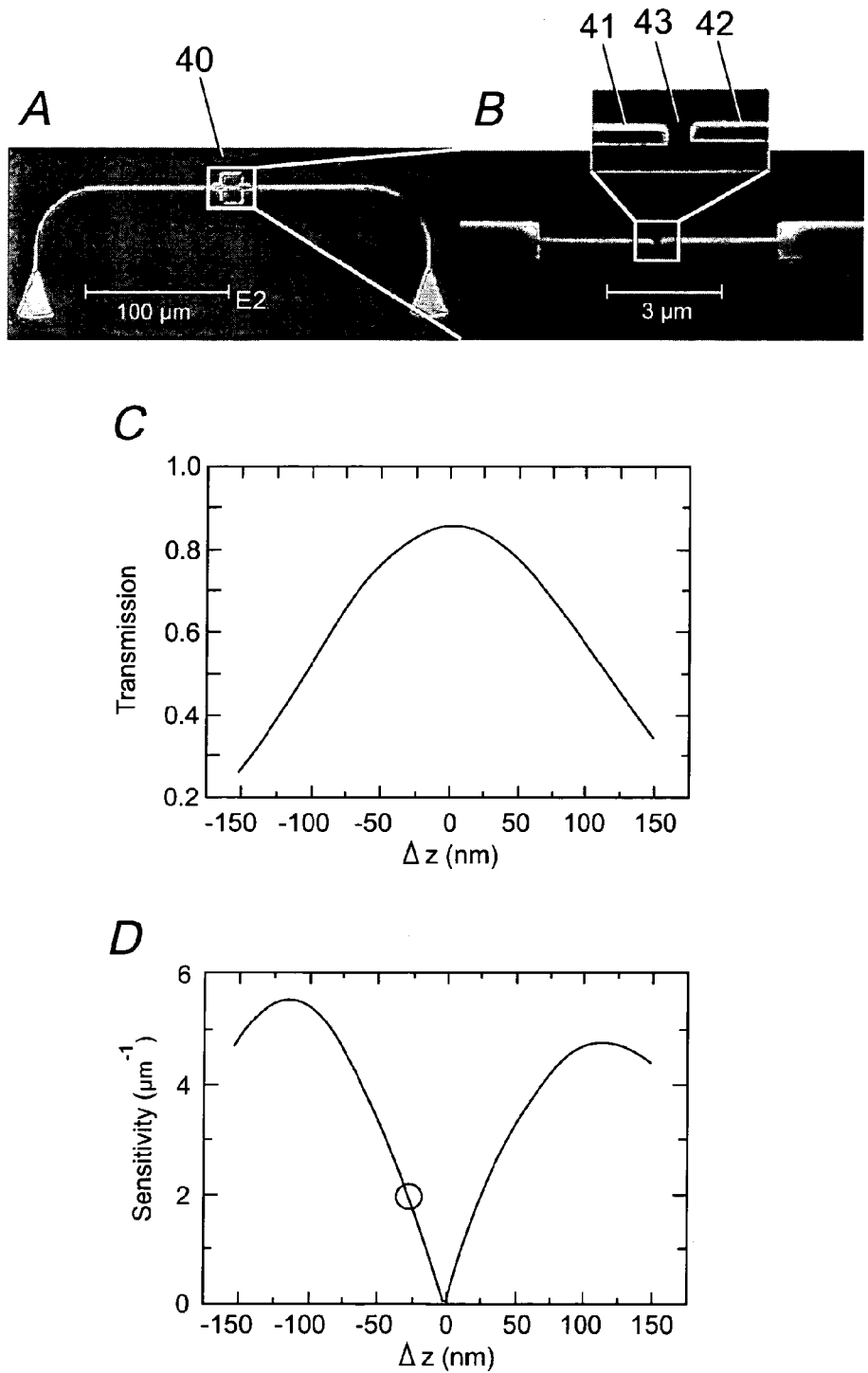
FIG. 10 illustrates end-to-end cantilevered waveguide nanolevers 41,42 embodying one or more aspects of the invention.

An exemplary cantilevered waveguide 40 is illustrated in FIG. 10. The waveguide is similar to the waveguide described above, however during fabrication a gap 43 is created such that the suspended waveguide is cantilevered.

Movement of the cantilever modulates the total transmission of the circuit and as such the displacement is measured in the transmitted optical signal. The Applicant has demonstrated displacement sensitivity of 40 fm/Hz$^{1/2}$ at room temperature, which is comparable with state-of-the-art millikelvin detection techniques of similar nanomechanical devices.

In the illustrated waveguide the cantilevers 41,42 are 3 μm long with a lateral gap 43 between them of 200 nm. The estimated optical loss caused by this relatively small (compared to the optical wavelength) is ~3 dB. FIG. 10c presents the simulated transmission from one cantilever to the other as a function of the vertical offset of the left cantilever. The asymmetry in the transmission profile is due to the additional coupling of the optical fields in the waveguide to the substrate.

Figure 6:
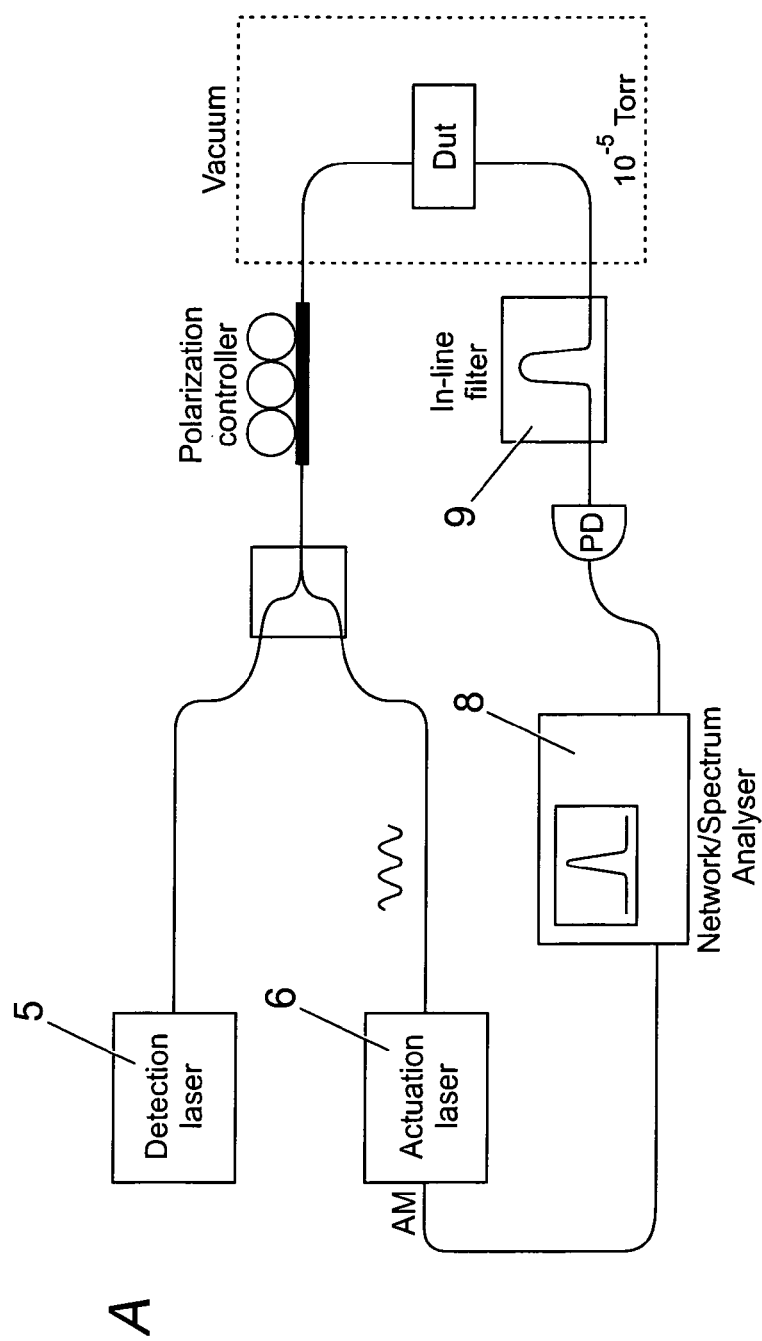
FIG. 6 illustrates the ultrasensitive measurement of the thermomechanical motion of nanocantilevers. 6a demonstrates the measurement set-up, 6b shows the measured noise power spectral density of the optical detection signal showing the room-temperature thermomechanical resonance peaks of both cantilevers and 6c shows the corresponding displacement PSD of the second nanocantilever, showing a displacement measurement noise floor of 40 fm/Hz$^{1/2}$.
Figure 6:
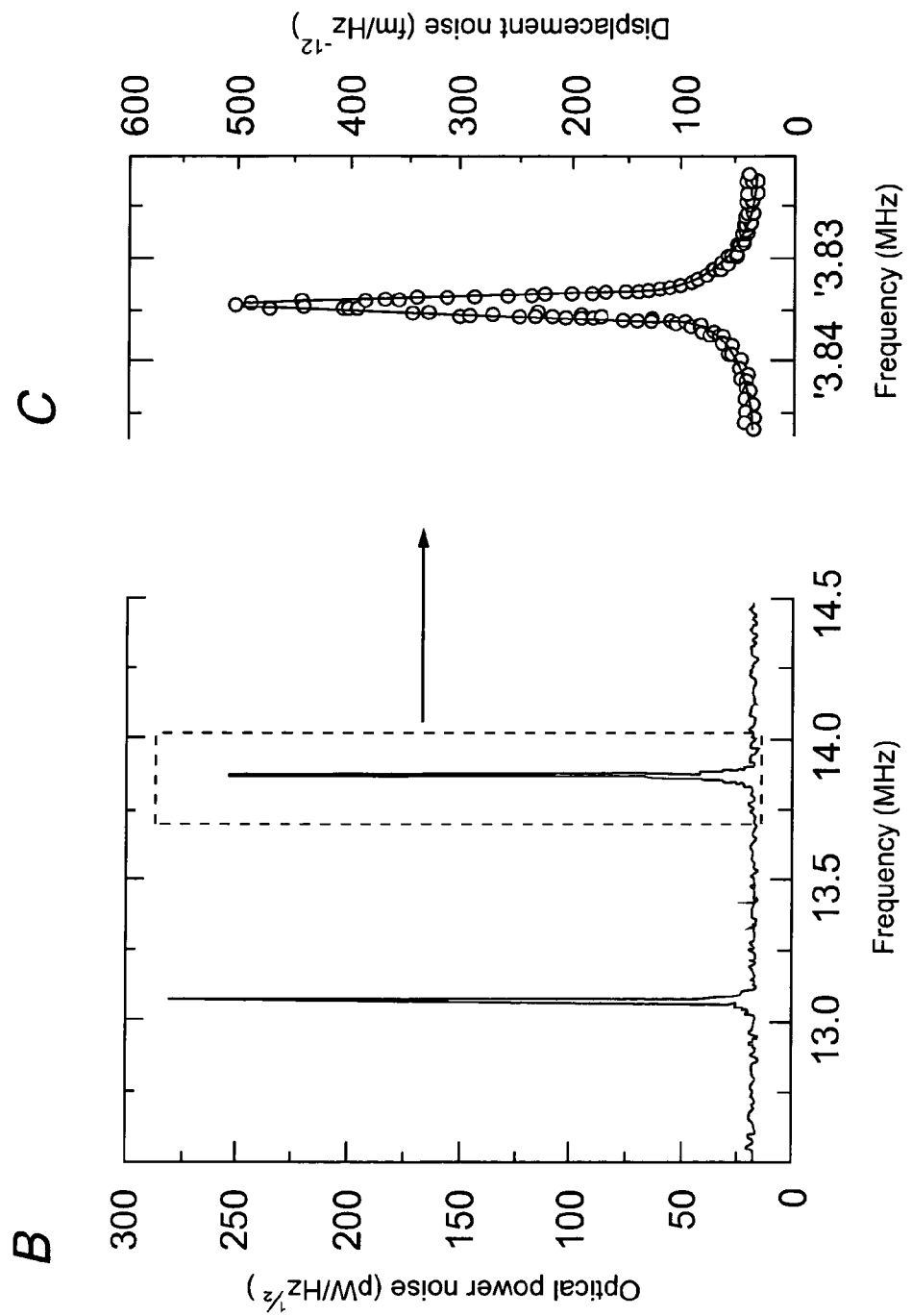

An exemplary measurement setup is illustrated in FIG. 6a. An array of fibres is aligned to the grating couplers to provide convenient input and output of optical signals. Light from two tuneable diode lasers 5,6 at different wavelengths is coupled into the device which is mounted in a vacuum chamber with a base pressure of $1\times10^{-5}$ Torr. The first laser 6 is amplitude modulated to apply an optical actuation force to the device. The second detection laser 5 is used in CW mode and its transmission through the circuit is measured with a photodetector. A narrow band etalon filter 9 removes the light at the actuation wavelength before reaching the photodetector in order to optimize the measurement dynamic range. The frequency response and noise spectrum of the photodetector signal is then measured with a network/spectrum analyzer 8.

The sensitivity of the system is first assessed by measuring the thermomechanical motion of the devices when the actuation laser is turned off. In FIG. 6b, the noise power spectrum density (PSD) of the transmitted detection laser signal in a wide frequency range is displayed. The applied optical power at the input coupler is 50 mW; the calibrated power on the first cantilever is ~7.5 mW; after propagating through the circuit 200 pW power is received at the photodetector.

The spectrum shows two prominent peaks at 13.07 and 13.36 MHz, corresponding to the out-of-plane fundamental mechanical resonances of the two cantilevers. The difference of their resonance frequency is due to the slight misalignment of the etching window during the wet etching, causing a different undercut at the clamping point. The two resonances show nearly identical quality factors of ~4500 in vacuum. The spectral density of thermomechanical displacement noise at the resonance frequency is $$S_z^{1/2} = \sqrt{4k_B T_0 Q/(m\omega_0^3)}$$

where $k_B$ is the Boltzmann constant, $T_0$ is the absolute temperature (300K), Q is the mechanical quality factor, $\omega_0$ is the angular resonance frequency and m the modal mass of the cantilever. The two thermomechanical resonances have different values due to their different resonant frequencies.

By comparing the expected displacement noise with the measured noise spectrum, we can determine the displacement sensitivity $R_0=\delta T/\delta z$ of the system, which is found to be 1.6 μm$^{-1}$, close to the numerical prediction at ~25 nm offset (FIG. 8d). In FIG. 6d, the noise floor of the measured noise spectrum is 16 pW/Hz$^{1/2}$, translates to 40 fm/Hz$^{1/2}$ displacement resolution at 7.5 mW optical power on the left cantilever. The noise level is constituted by the 13 pW/Hz$^{1/2}$ noise equivalent power (NEP) of the photodetector and the 9 pW/Hz$^{1/2}$ shot-noise of the 200 μW optical signal. The achieved displacement sensitivity is remarkable considering the simple room temperature measurement configuration. By improving the grating couplers and using a higher power laser source, the detection sensitivity can reach the shot-noise limit and be further improved as $P^{-1/2}$.

Figure 7:
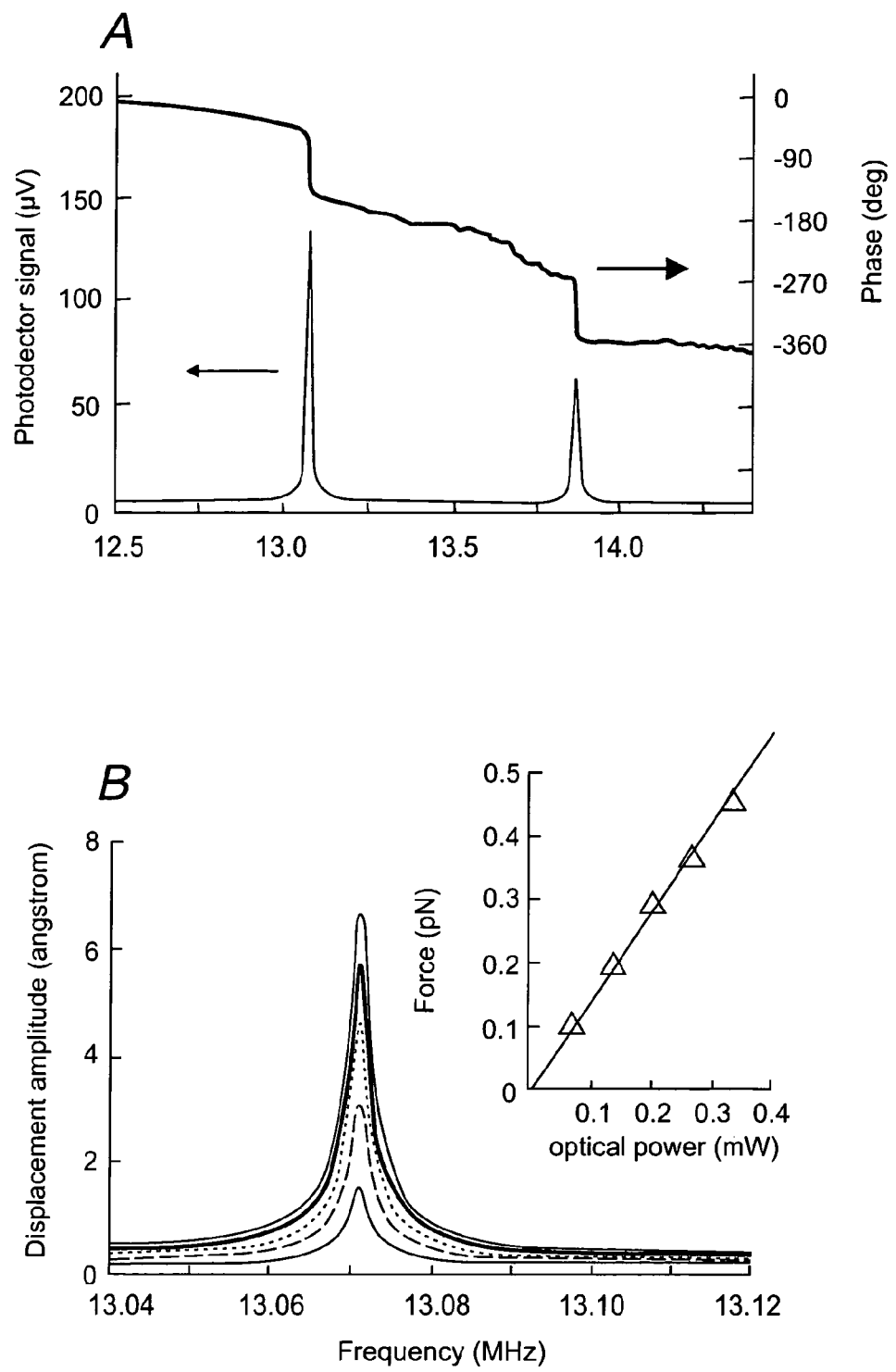
FIG. 7 illustrates optical actuation of the nanocantilevers. 7a shows the driven response of the waveguide nanocantilevers. The nanocantilevers are actuated by the gradient optical force generated by the amplitude modulated laser. The phase shows a clear 180° change at each resonance. 7b shows the resonance amplitude of the first cantilever at increasing actuation optical power, as marked in the inset. The optical force is determined to be 0.5±0.1 pN/μm/mW from the calibrated resonance amplitude and optical power.

When the actuation laser 6 is turned on and its amplitude is modulated, an oscillating gradient optical force is applied to the waveguide cantilevers 41,42. Photothermal excitation can be neglected because it is found to be three orders of magnitude weaker than the gradient optical force. The temperature rise from photothermal absorption is estimated to be on millikelvin level, due to the low absorption coefficient at telecomm wavelength and the high thermal conductivity of silicon. The driven response of the devices in amplitude and phase is shown in FIG. 7. The two cantilevers 41,42 show different resonant amplitudes. This is expected because the actuation optical powers on the two cantilevers are different due to the loss (~3 dB) occurring at the gap between them. Thus we can attribute the resonance peak at 13.07 MHz to the cantilever on the left, whose amplitude is around twice that of the one at 13.87 MHz since the light is launched into the devices from the left coupler.

Using the calibrated responsivity $R_0$ of the system, the vibration amplitude can be determined from the measured signal. At the resonance frequency, the driving force F is related to the vibration amplitude $a(\omega_0)$ of the cantilever by $F = k\, a(\omega_0)/Q$. In FIG. 7b, the resonant response of the first cantilever is measured in dependence of laser modulation amplitude, showing a linear relationship. The optical force can then be derived as ~0.5±0.1 pN/mW/μm, in close agreement with the measured value in similar state-of-the-art photonic circuits. The measurement error is mostly due to the uncertainty in determining of the actual optical power on the device.

The gradient optical force originates from the asymmetric optical field gradient in the waveguide due to coupling with the substrate. Therefore, this force, as well as the optical detection method described above, is intrinsically wideband. Thus, this complete optical transduction scheme can potentially gain unprecedented operation bandwidth. The amplitude modulation detection that is applied here is essentially a non-interferometric method. It is distinct from interferometric methods in which the mechanical motion induced optical phases shift is measured. Thus the measurement does not require a coherent light source and is immune to the phase noise of the laser. For practical sensing applications, the non-interferometric detection method is especially attractive because integrated low-cost light sources can be used. With future development of other integrated photonic components, including light sources, modulators and detectors, an entire coupled nanomechanical-nanophotonic system can be realized on a single chip. Such a compact, robust system with high sensitivity will find a wide range of applications, such as chemical and biological sensing and optical signal processing.

The Applicants have been able to create a number of devices that make use of the present invention, some of which are now described to illustrate the practical application of the above techniques.

Figure 8:
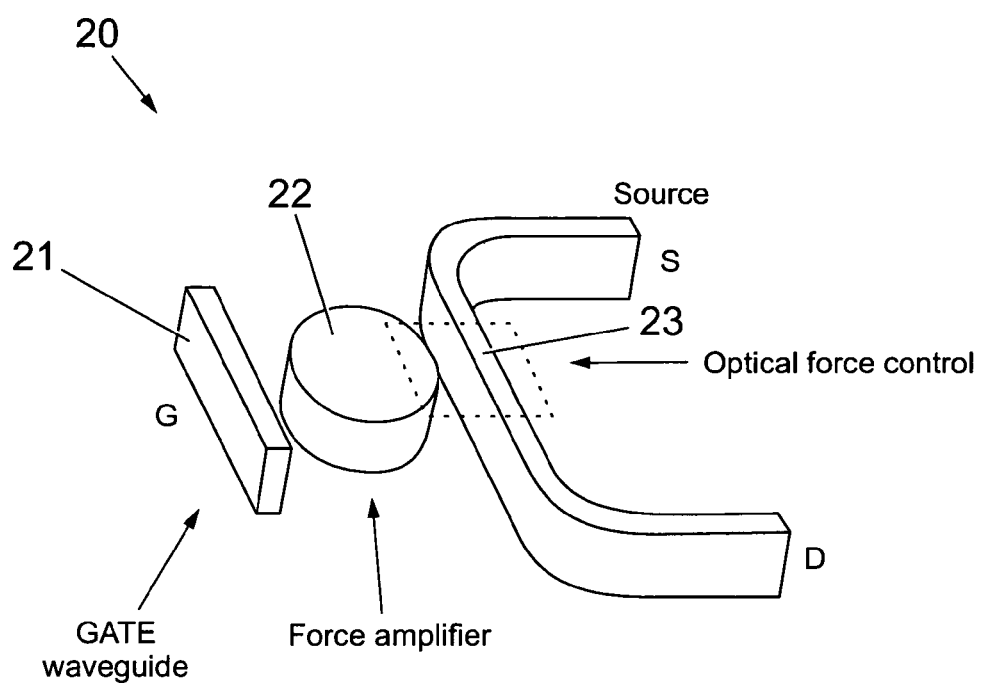
FIG. 8 shows in schematic form a first example of a practical device embodying one or more aspects of the invention which takes the form of a photonic transistor 20.

FIG. 8 illustrates in schematic form a first practical embodiment of the present invention, taking the form of what might be termed a photonic transistor 20. The photonic transistor comprises a gate waveguide 21 which serves as a signal input for a control signal. A high Q optical resonator 22 is coupled to the gate waveguide 21 so as to enhance the input optical signal; for the purposes of this example the resonator 22 is a microdisk resonator but may be a of a ring or racetrack type.

A second waveguide 23 (shown schematically) is coupled to the optical resonator and, in accordance with the invention, is suspended (i.e. spaced from the substrate) so as to form a nanomechanical resonator. The interaction between the optical resonator 22, which acts as a force amplifier, and the suspended waveguide 23 (nanomechanical resonator) means that a CW optical signal propagating within the waveguide 23 can be modulated by an optical signal within the gate waveguide 21. This is analogous to an electronic transistor whereby the current at the base determines whether charge may flow between the emitter and collector.

In the photonic transistor, a high optical Q and a high mechanical Q can result in the input signal in the gate waveguide 21 being amplified, much in the same way that an electronic transistor is employed in a common emitter amplifier. In this way, a small input modulation can result in, effectively, an amplification of this modulation within the suspended waveguide 23.

Figure 9:
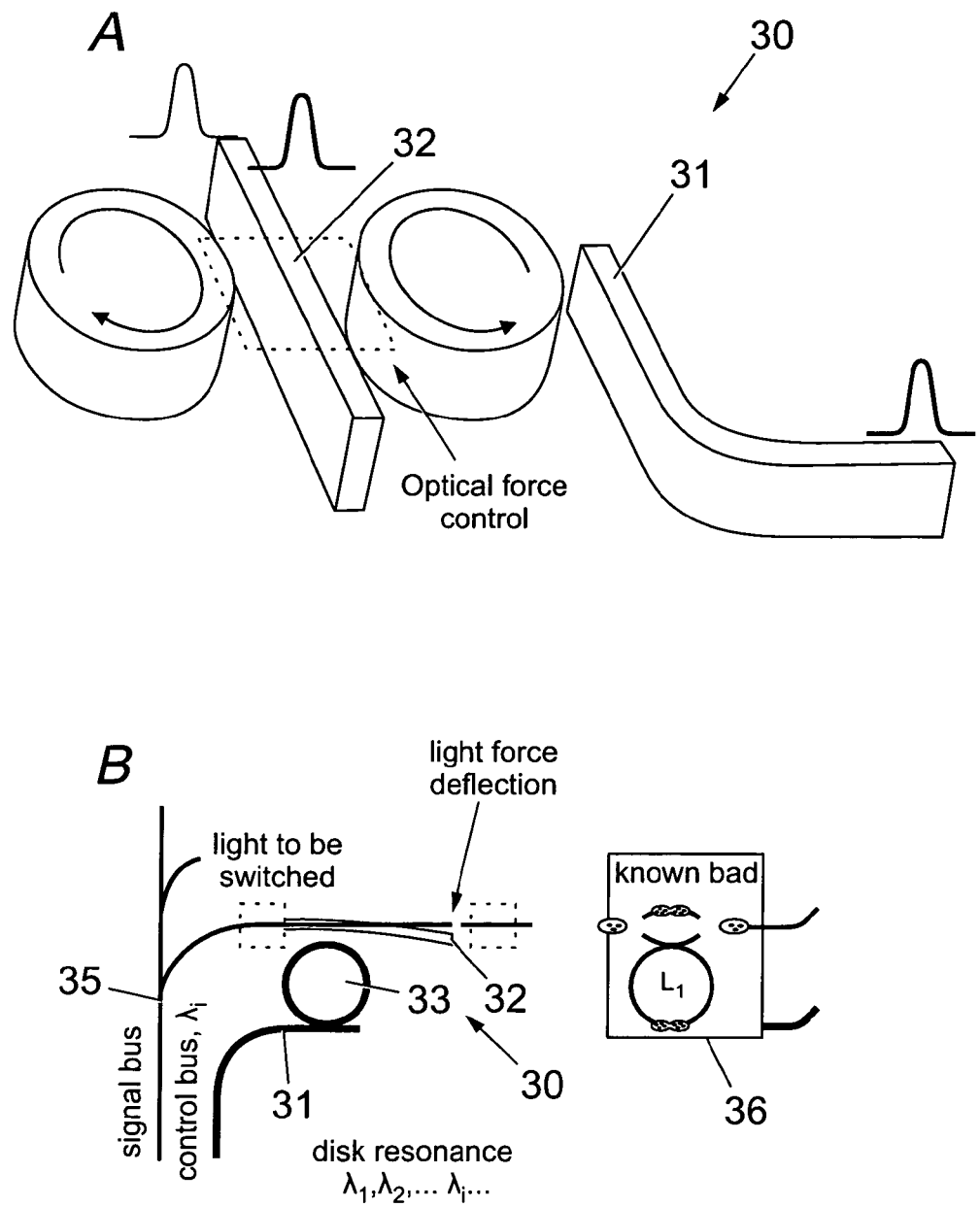
FIG. 9a shows in schematic form a photonic switch 30 embodying the invention, and 9b shows a practical application of the photonic switch being employed to cut off an optical sub-circuit which is known to be bad.

FIG. 9 illustrates in schematic form a second practical embodiment of the present invention, taking the form of what might be termed a photonic switch 30. In this embodiment, two cantilevered waveguides 31,32 are embedded in a photonic circuit. As described above, the buckling of one cantilever by an applied optical force modifies the transmission of that waveguide.

The photonic switch can be used in the opposite sense to prevent an optical signal being relayed to a part of the optical circuit that is bad by cutting off that part of the circuit.

FIG. 9b illustrates such a practical example. A signal bus 35 within an optical circuit has a number of branches, one of which is connected to a sub-circuit 36 which is known to be bad. This branch has a cantilevered waveguide 32 in accordance with the present invention and is operatively controlled by a control bus 31 by way of a disk resonator 33 to which both are optically coupled. A signal sent to the control bus 31 causes a displacement of one of the cantilevered portions of the waveguide 32, thus "cutting off" the bad sub-circuit 36.

In addition, because the cantilevered waveguide permits variable attenuation of an optical signal, the photonic switch 30 can also be used to control the amount of optical power within an optical signal that is passed on to various sub-circuits forming part of a larger photonic circuit. In FIG. 9b above, it is clear that a control signal of less power would cause a smaller displacement of the cantilevered portion of the waveguide 32 and attenuate, rather than cut off, the optical signal.

Note that in such embodiments, it is advantageous that one of the cantilevered portions of the waveguide is substantially elongate compared to the relatively shorter other cantilevered portion. Having such a longer cantilevered portion means that a greater range of displacement can be achieved; the other cantilevered portion being shorter means that it is comparatively stationary while the other is free to move. However, having two cantilevered portions of more or less equal length may still serve the same purpose although the same degree of tuning may be harder to achieve.

It is of note that a cantilever has a greater range of movement than a continuous beam and as such even having cantilevered portions of similar length can produce a larger attenuation range.

A further application of such a device is as a nanomechanical optical modulator, whereby the light passing through the photonic circuit can be modulated. To effect such modulation, a corresponding modulation would be applied to the control line. In a similar fashion to the photonic transistor shown in FIG. 8 and described above, such modulation could of course be amplified, thus allowing a comparatively smaller control signal modulation to effect a larger modulation within the optical circuit.

A combination of a number of such photonic switches clearly may be used to provide a comprehensive array of controls over an optical circuit; determining which sub-circuits receive an optical signal, the power of the optical signal that said sub-circuit receives, as well as providing protection in the form of automatic or selective cut-offs to either protect sub-circuits or isolate non-working sub-circuits.

For metrological applications, a cantilevered waveguide as illustrated in FIG. 10 can be used as a scanning probe 40. FIG. 10a is an optical microscope image of end to end coupled waveguide nanocantilevers 41,42 in the middle of a waveguide and a grating coupler at each end. FIG. 10b is a scanning electron microscope image of the suspended portion, clearly showing the separation 43 in the suspended waveguide that creates the two cantilevers 41,42. As described in detail above, relatively minor displacement of the cantilevers results in a dramatic effect on the transmission of the device.

Figure 11:
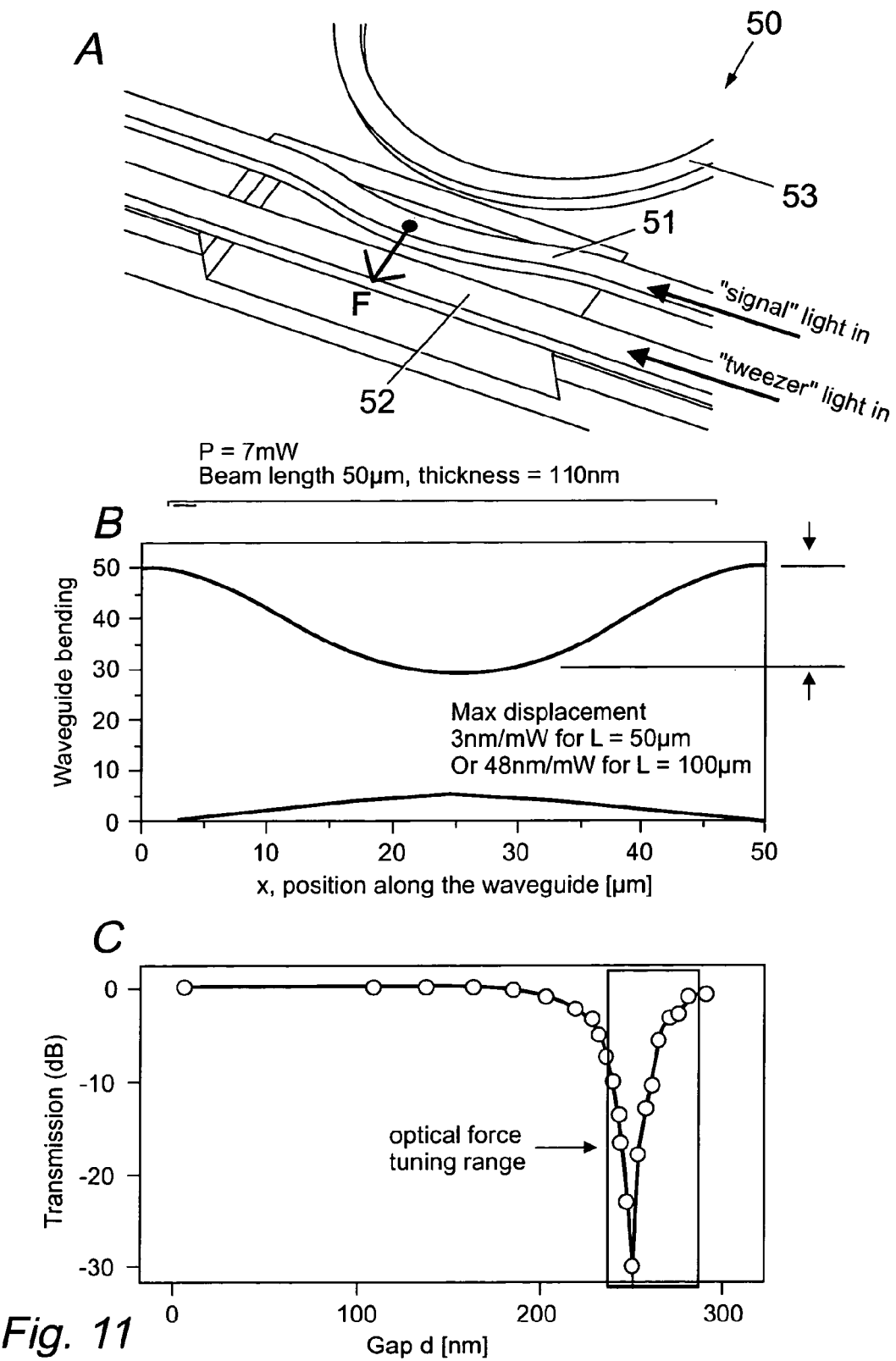
FIG. 11 illustrates a light force tuneable photonic coupler 50 embodying one or more aspects of the invention.

FIG. 11 illustrates a tuneable coupler 50 in a photonic filter in which two freely suspended waveguides 51,52 extend parallel to, and are optically side-coupled to, one another. A tuneable coupler is an essential component in a photonic filter and the coupler illustrated here tunes the gap between the waveguide 51 and the optical resonator 53. An all-optical device such as this does away with the need for material doping and electrode deposition because unlike state-of-the-art tuneable couplers no thermal heating or electrostatic tuning is required.

When an optical force is applied, i.e. by inserting a "tweezer" light signal into the second waveguide 52, the suspended waveguides 51,52 move with respect to each other, thus modifying the gap therebetween. The change in the gap causes a corresponding modification of the coupling intensity between the waveguides 51,52 and also between the first waveguide 51 and the optical resonator 53.

If the ring resonator is used as a wavelength filter, achieving a high extinction ratio requires close matching between the amplitude loss per round trip and the coupling coefficient. However, precision matching is difficult to achieve with state-of-the-art microfabrication techniques. The illustrated coupler 50 allows precise control of the gap spacing between the waveguide 51 and the microresonator 53 and as such highest extinction can be achieved. FIG. 11b illustrates the change in the gap caused by the "tweezer" light signal, and FIG. 11c demonstrates how in this example a 30 dB extinction ratio may be achieved within 50 nm of tuning.

Figure 12:
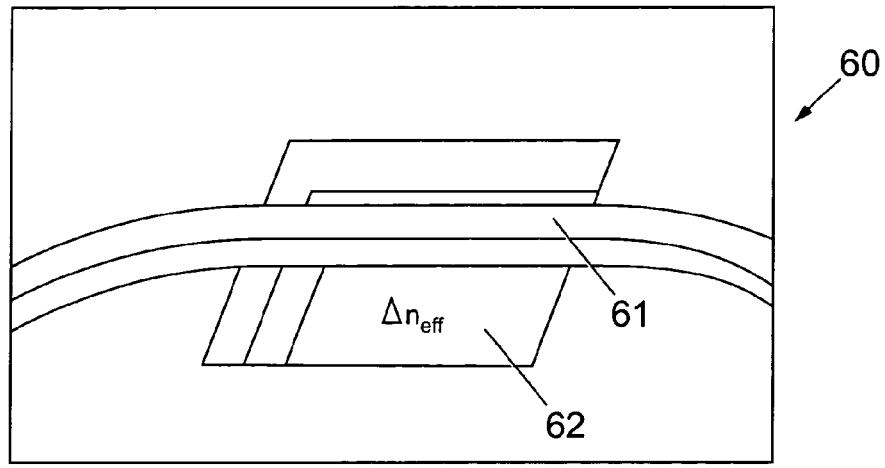
FIG. 12 illustrates a tuneable phase shifter 60 which operates by optical force which embodies one or more aspects of the invention.
Figure 12:
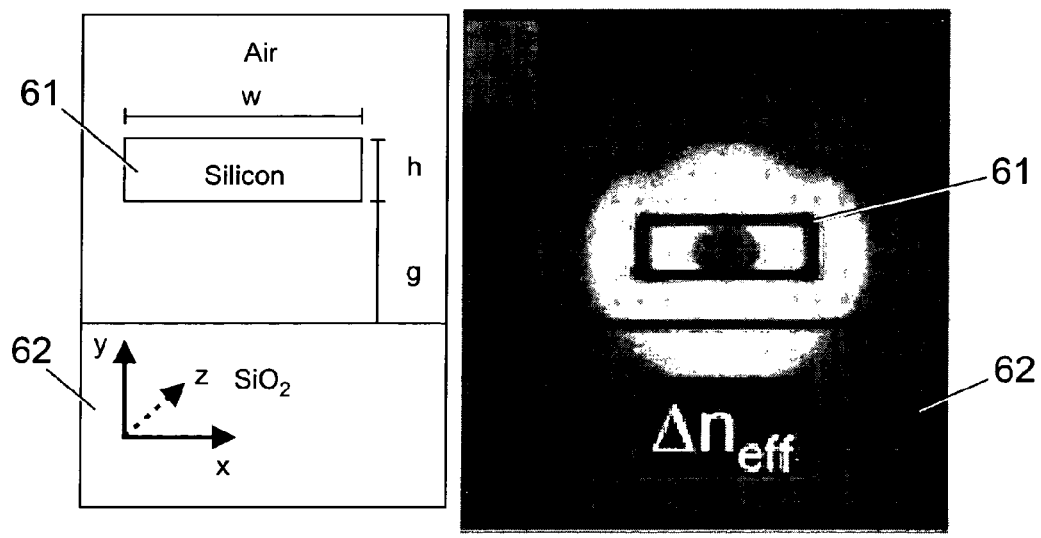

Tuneable phase shifting can also be realised in a device 60, as illustrated in FIG. 12, which is fabricated as a portion of a waveguide or embedded in a microresonator to achieve precise phase matching. The major advantage of this is the negligible insertion loss that can be achieved.

The phase tuning is achieved by changing the refractive index of the waveguide 61. An analogy may be drawn between a tuneable capacitor consisting of two parallel plates in which the gap can be modified. The variance of this gap in the optical system is provided by the optical force which in turn provides the phase tuning.

The coupling between the waveguide 61 and the dielectric substrate 62 from which it is spaced acts like an electromagnetic buffer that stores then releases energy in the form of light, thus introducing a phase shift to a propagating optical signal.

When the device 60 is placed in a microresonator, the phase tuning effect can be significantly enhanced because the circulating power is enhanced by the optical finesse of the microresonator, adding proportionately to the optical force.

Figure 13:
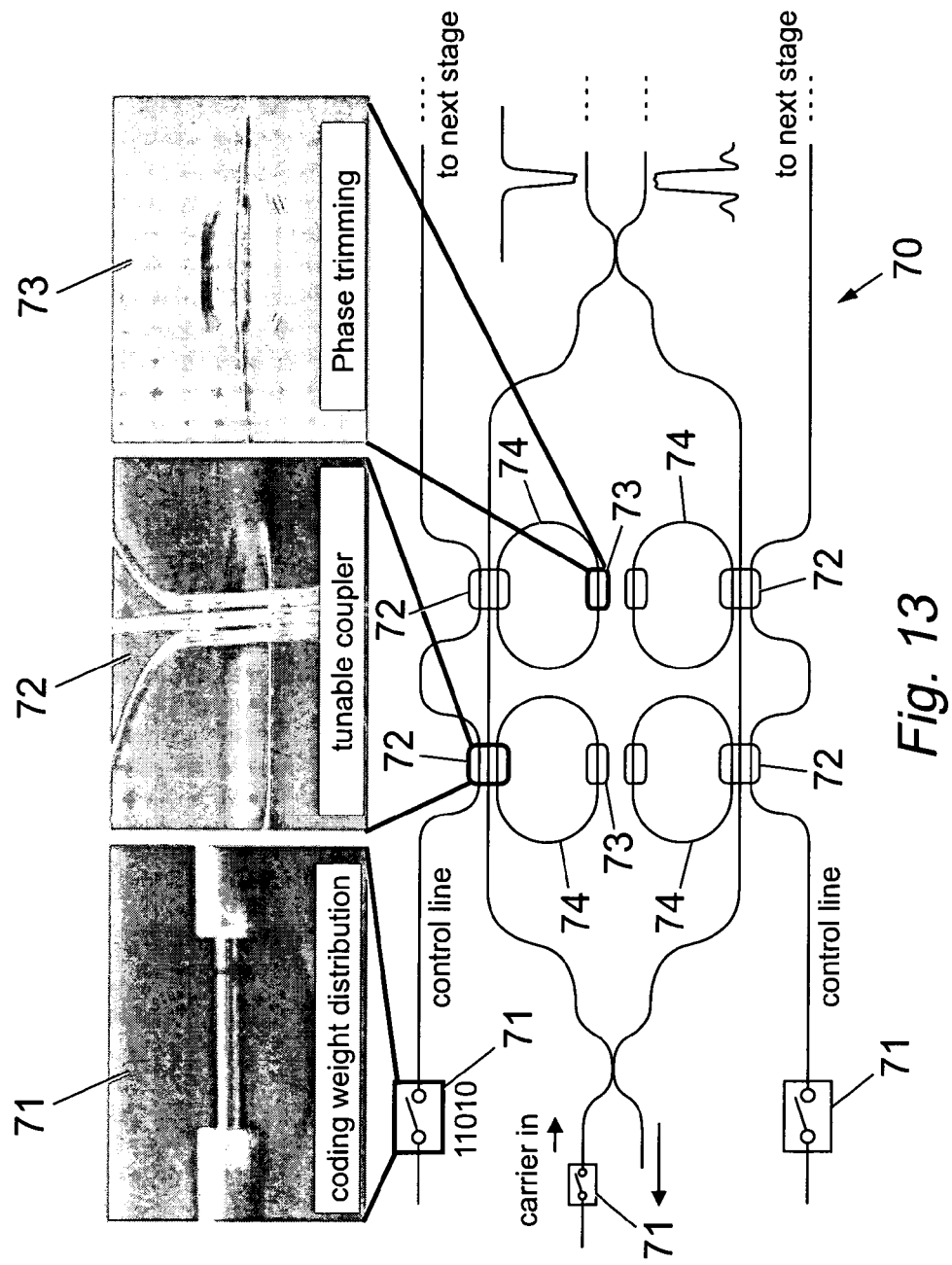
FIG. 13 illustrates in schematic form a tuneable filter 70 which embodies a number of aspects of the invention, namely a cantilevered waveguide 71, a tuneable coupler 72 and a tuneable phase shifter 73.

Tuneable switches (e.g. 71), phase shifters (e.g. 73), and couplers (e.g. 72) can be further used as building blocks to assemble more complex photonic filters (e.g. 70). These filters could be engineered to have multiple poles and zeros depending on the numbers and the topologies of these tuneable components. Although there are many configurations one can devise for actual filter implementation, we exemplify a typical filter construction 70 in FIG. 13 which represents a two-pole two-zero filter. The mechanically-deformable tuneable devices 71,72,73 are utilized as active control elements to set the coupling ratios and phases of each individual ring resonator 74, which in turn determine the zeros and the poles of the filter.

Figure 14:
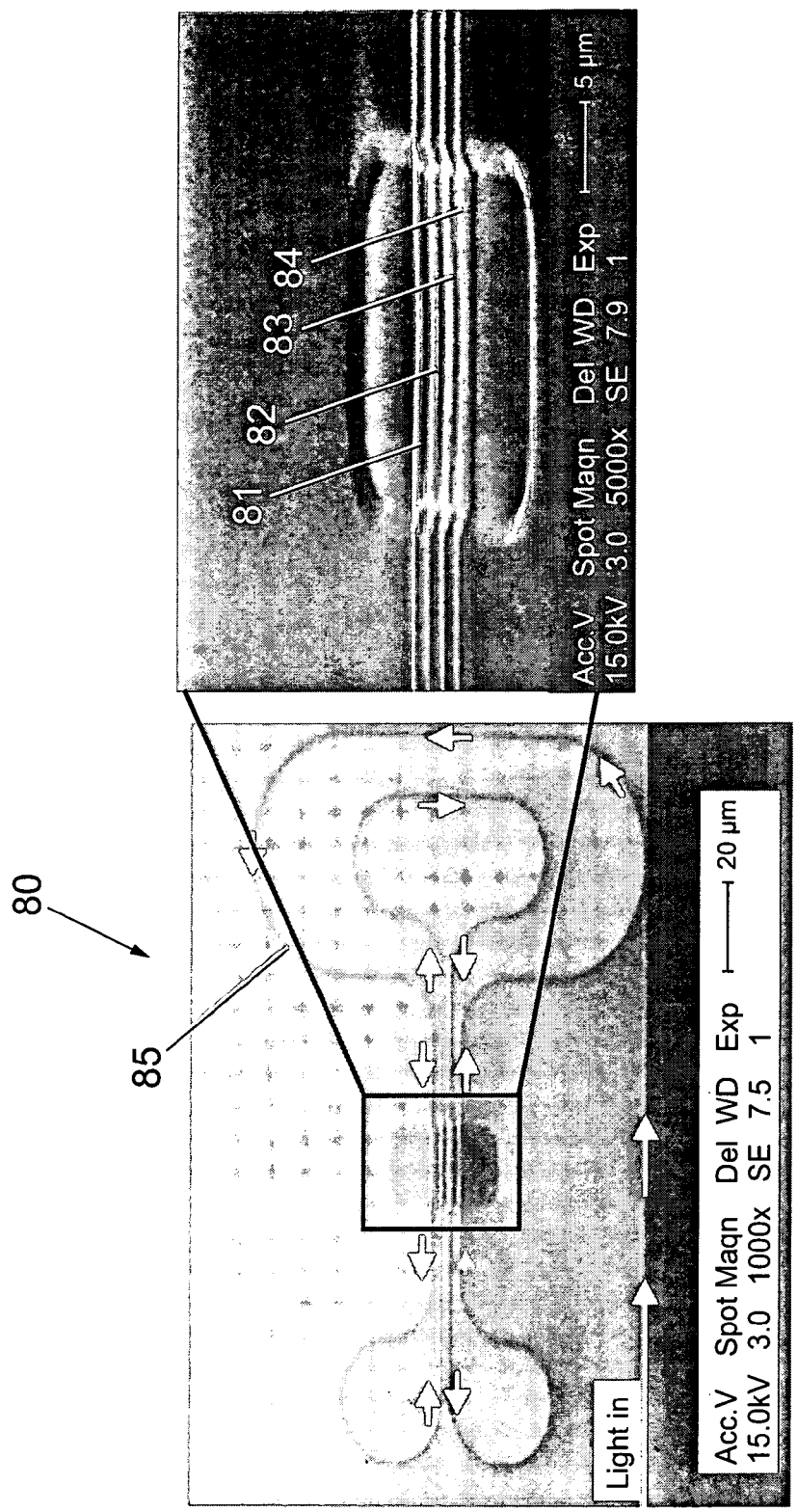
FIG. 14 illustrates a photonic bus synchronised oscillator 80 that embodies one or more aspects of the invention.

A synchronised oscillator 80 is illustrated in FIG. 14. A series of (example shown: four) nanomechanical resonators 81,82,83,84 are fabricated on the same photonic bus 85. The light travelling along the bus passes from one resonator to the next and thus provides a synchronising force on all the nanomechanical resonators.

In addition, the light may be further looped back from the last resonator 84 to the first resonator 81 which enhances said synchronisation. Such synchronised oscillators will be ideal for us as ultrastable signal sources because of the very low phase noise that can be achieved in such a configuration.

Further modifications and improvements may be added without departing from the scope of the invention as defined by the appended claims.

REFERENCES

1. Cannon, T. et al. Temporal behavior of radiation-pressure-induced vibrations of an optical microcavity phonon mode *Physical Review Letters* 94 (22) (2005).
2. Kippenberg, T. J. and Vahala, K. J. Cavity opto-mechanics *Optics Express* 15 (25), 17 172 (2007).
3. Eichenfield, M., Michael, C. P., Perahia, R., and Painter, O. Actuation of micro-optomechanical systems via cavity-enhanced optical dipole forces *Nature Photonics* 1 (7), 416 (2007).
4. Povinelli, M. L. et al. Evanescent-wave bonding between optical waveguides *Optics Letters* 30 (22), 3042 (2005).
5. Mizrahi, A. and Schachter, L. Mirror manipulation by attractive and repulsive forces of guided waves *Optics Express* 13 (24), 9804 (2005).
6. Kippenberg, T. J. et al. Analysis of radiation-pressure induced mechanical oscillation of an optical microcavity *Physical Review Letters* 95 (3) (2005).
7. Mamin, H. J. and Rugar, D. Sub-attonewton force detection at millikelvin temperatures *App. Phys. Lett.* 79 (20), 3358 (2001).
8. Garmire, E. Criteria for optical bistability in a lossy saturating fabry-perot *Ieee Journal of Quantum Electronics* 25 (3), 289 (1989).

The invention claimed is:

1. An optomechanical device comprising:
   a waveguide comprising a gap that defines a first cantilever portion and a second cantilever portion of the waveguide;
   a dielectric body;
   an optical input coupler that mechanically supports the first cantilever portion; and
   an optical input coupler that mechanically supports the second cantilever portion;

wherein at least a portion of the waveguide is separated from the dielectric body at a distance which permits evanescent coupling of a guided lightwave to the dielectric body;

wherein a transverse gradient force induced by the guided lightwave causes a displacement of the waveguide.

2. A device as described in claim 1, wherein the waveguide is a single mode waveguide, or configured for single mode operation.

3. A device as described in claim 1, wherein the dielectric body comprises a substrate, a second waveguide or a side dielectric body such as silicon, silicon nitride or silicon dioxide.

4. A device as described in claim 1, wherein one or both of the input and output couplers comprise a photonic crystal adapted to support a single transverse mode.

5. A device as described in claim 1, wherein one of the first or second cantilever portions is substantially longer than the other of said first or second cantilever portions.

6. An optomechanical device comprising:
a waveguide comprising a gap that defines a first cantilever portion and a second cantilever portion of the waveguide;
a dielectric body; and
a first and second laser employed in a pump-probe configuration; and
wherein at least a portion of the waveguide is separated from the dielectric body at a distance which permits evanescent coupling of a guided lightwave to the dielectric body;
wherein a transverse gradient force induced by the guided lightwave causes a displacement of the waveguide; and
wherein the first laser is amplitude modulated to produce a corresponding modulation of the optical force on the waveguide and the second laser provides a probe signal to allow interferometric detection of the effects on the waveguide produced by the modulation.

7. The optomechanical device of claim 1, comprising:
a gate waveguide which receives an optical signal;
an optical resonator positioned between the waveguide and the gate waveguide; and
wherein the optical resonator is coupled to the gate waveguide and to the waveguide such that modulation of the optical signal produces a corresponding modulation of the optical force on the waveguide.

8. The optomechanical device of claim 7, further comprising a first laser, whereby modulation of the optical signal within the gate waveguide produces a modulated output from the device.

9. A photonic switch comprising:
a device, the device comprising:
a waveguide;
a dielectric body;
wherein at least a portion of the waveguide is separated from the dielectric body at a distance which permits evanescent coupling of a guided lightwave to the dielectric body;
wherein a transverse gradient force induced by the guided lightwave causes a displacement of the waveguide; and
wherein the waveguide comprises a gap defining a first and a second cantilever portion of the waveguide;
a control bus;
an optical resonator positioned therebetween; and
wherein the optical resonator is coupled to the control bus and to the device waveguide such that the optical resonator displaces at least one of the first and second cantilever portions of the device waveguide responsive to an optical signal in the control bus.

10. A measurement device comprising:
a device, the device comprising:
a waveguide;
a dielectric body;
wherein at least a portion of the waveguide is separated from the dielectric body at a distance which permits evanescent coupling of a guided lightwave to the dielectric body;
wherein a transverse gradient force induced by the guided lightwave causes a displacement of the waveguide;
wherein the waveguide comprises a gap defining a first and a second cantilever portion of the waveguide; and
wherein a transmitted signal is modulated by coupling to the dielectric body.

11. A measurement device comprising:
a device, the device comprising:
a waveguide;
a dielectric body;
wherein at least a portion of the waveguide is separated from the dielectric body at a distance which permits evanescent coupling of a guided lightwave to the dielectric body;
wherein a transverse gradient force induced by the guided lightwave causes a displacement of the waveguide;
wherein the waveguide comprises a gap defining a first and a second cantilever portion of the waveguide; and
wherein a measurement signal is obtained by measuring the reflection of the guided lightwave within the device waveguide at the gap.

12. The optomechanical device of claim 1, comprising:
a second waveguide spaced from and substantially parallel to the waveguide, said waveguide and said second waveguide optically side-coupled such that the optical force produced by the guided lightwave causes a movement of one waveguide relative to the other so as to modify the coupling intensity therebetween.

13. The optomechanical device of claim 1, comprising:
wherein an optical force is applied to deflect the waveguide so as to produce a phase change affecting the guided lightwave.

14. The optomechanical device of claim 1, comprising:
wherein the device comprises a second waveguide in a serial relationship with the waveguide defining a photonic bus.

15. The optomechanical device of claim 14, wherein the device comprises three or more waveguides arranged in said serial relationship by coupling an output of each waveguide to the input of a subsequent waveguide, the output coupler of the last such waveguide coupled to the input coupler of the first such waveguide so as to define a continuous photonic bus.

16. The optomechanical device of claim 1, wherein at least one of the optical input coupler and the optical output coupler comprises a multimode interference coupler.

17. The optomechanical device of claim 1, wherein the optomechanical device has a wide optical bandwith limited only by the bandwidth of the optical input coupler and the optical output coupler.

18. The optomechical device of claim 17, wherein the wide optical bandwidth corresponds to less than picosecond optical response time.

* * * * *

UNITED STATES PATENT AND TRADEMARK OFFICE
CERTIFICATE OF CORRECTION

PATENT NO. : 8,639,074 B2  Page 1 of 1
APPLICATION NO. : 12/920631
DATED : January 28, 2014
INVENTOR(S) : Tang et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 342 days.

Signed and Sealed this
Twenty-second Day of September, 2015

Michelle K. Lee
*Director of the United States Patent and Trademark Office*